US008801979B2

(12) United States Patent
Chang et al.

(10) Patent No.: US 8,801,979 B2
(45) Date of Patent: Aug. 12, 2014

(54) APPARATUS AND METHOD FOR CONTINUOUS PRODUCTION OF MATERIALS

(75) Inventors: Chih-hung Chang, Corvallis, OR (US); Hyungdae Jin, College Station, TX (US)

(73) Assignee: State of Oregon acting by and through the State Board of Higher Education on behalf of Oregon State University, Corvallis, OR (US)

( * ) Notice: Subject to any disclaimer, the term of this patent is extended or adjusted under 35 U.S.C. 154(b) by 308 days.

(21) Appl. No.: 13/158,142

(22) Filed: Jun. 10, 2011

(65) Prior Publication Data

US 2012/0001356 A1 Jan. 5, 2012

Related U.S. Application Data

(60) Provisional application No. 61/397,522, filed on Jun. 10, 2010.

(51) Int. Cl.
*B29B 9/00* (2006.01)

(52) U.S. Cl.
USPC .................................. 264/11; 425/6; 422/129

(58) Field of Classification Search
CPC .............. B01J 19/00; B01J 19/24; B29B 9/00
USPC ................... 264/11; 425/6; 422/129
See application file for complete search history.

(56) References Cited

U.S. PATENT DOCUMENTS 3,361,525 A * 1/1968 De Rycke et al. ............ 423/337
7,252,814 B2 8/2007 De Mello et al.
7,470,308 B2 12/2008 Shiraishi et al.
7,507,380 B2 3/2009 Chang et al.
7,829,059 B2 11/2010 Guo et al.
7,846,489 B2 12/2010 Chang
2004/0025634 A1* 2/2004 Nakamura et al. .............. 75/335
2007/0128707 A1 6/2007 Rorrer et al.

(Continued)

FOREIGN PATENT DOCUMENTS

WO  WO 2010/085764  7/2010

OTHER PUBLICATIONS

Gur et al., "Air-Stable All-Inorganic Nanocrystal Solar Cells Processed from Solution," *Science* 310:462-465, Oct. 21, 2005.
Kovalenko et al., "SnTe Nanocrystals: A New Example of Narrow-Gap Semiconductor Quantum Dots," *J. Am. Chem. Soc.* 129(37)11354-11355, 2007.

(Continued)

*Primary Examiner* — James Sanders
(74) *Attorney, Agent, or Firm* — Klarquist Sparkman, LLP

(57) ABSTRACT

Embodiments of a continuous-flow injection reactor and a method for continuous material synthesis are disclosed. The reactor includes a mixing zone unit and a residence time unit removably coupled to the mixing zone unit. The mixing zone unit includes at least one top inlet, a side inlet, and a bottom outlet. An injection tube, or plurality of injection tubes, is inserted through the top inlet and extends past the side inlet while terminating above the bottom outlet. A first reactant solution flows in through the side inlet, and a second reactant solution flows in through the injection tube(s). With reference to nanoparticle synthesis, the reactant solutions combine in a mixing zone and form nucleated nanoparticles. The nucleated nanoparticles flow through the residence time unit. The residence time unit may be a single conduit, or it may include an outer housing and a plurality of inner tubes within the outer housing.

33 Claims, 25 Drawing Sheets

(56) References Cited

U.S. PATENT DOCUMENTS

| | | |
|---|---|---|
| 2007/0184576 A1 | 8/2007 | Chang et al. |
| 2008/0108122 A1 | 5/2008 | Paul et al. |
| 2009/0269250 A1 | 10/2009 | Panagiotou et al. |
| 2009/0295005 A1 | 12/2009 | Rauscher et al. |
| 2010/0052204 A1 | 3/2010 | Takagi et al. |
| 2010/0261304 A1 | 10/2010 | Chang et al. |

OTHER PUBLICATIONS

Lin et al., "Synthesis of Silver Nanoparticles in a Continuous Flow Tubular Microreactor," *Nano Letters* 4(11):2227-2232, 2004.

Malik et al., "A Novel Route for the Preparation of CuSe and $CuInSe_2$ Nanoparticles," *Advanced Materials* 11(17):1441-1444, Dec. 1999.

Mansur et al., "A State-of-the-Art Review of Mixing in Microfluidic Mixers," *Chinese Journal of Chemical Engineering* 16(4):503-516, 2008.

\* cited by examiner

APPARATUS AND METHOD FOR CONTINUOUS PRODUCTION OF MATERIALS

CROSS REFERENCE TO RELATED APPLICATION

This application claims the benefit of the earlier filing date of U.S. Provisional Application No. 61/397,522, filed Jun. 10, 2010, which is incorporated herein by reference.

ACKNOWLEDGMENT OF GOVERNMENT SUPPORT

This invention was made with government support under grant number NT08847 DOE ITP awarded by Department of Energy's Office of Energy Efficiency and Renewable Energy, Industrial Technology Program, Nanomanufacturing Activity, and grant number FA8650-05-1-5041 awarded by the Air Force Research Laboratory. The United States government has certain rights in the invention.

FIELD

The present disclosure concerns embodiments of a continuous-flow injection reactor suitable for producing materials, such as for the continuous synthesis of nanoparticles.

BACKGROUND

Nanocrystalline semiconductors have attracted a considerable amount of attention due to their unique physiochemical properties and potential applications in novel optical, electrical, and optoelectrical devices. Recent advances in nanocrystals are having a dramatic impact on the development of next generation low-cost and/or high-efficiency solar cells. For example, Gur et al., reported air-stable, all-inorganic nanocrystal solar cells processed from solution using CdSe and CdTe nanorods. (Gur et al., *Science*, 310:462-465 (2005).) $CuInSe_2$ and its related alloys, including $CuInS_2$, $CuGaSe_2$, and $CuGaS_2$, are promising materials for photovoltaics due to their unique structural and electrical properties. Thin-film solar cells formed with these materials are highly stable against radiation, which makes them ideal for space applications. Semiconductor nanocrystal inks can be used to lower the fabrication cost of the absorber layers of the solar cells. In addition, hybrid organic and inorganic materials are promising for the realization of low-cost roll-to-roll printing of solar cells.

Semiconductors with a direct bandgap between 1 eV and 2 eV, including $Cu(In,Ga)Se_2$ (1.04-1.6 eV) and $CuIn(Se,S)_2$ (1.04-1.53 eV), are suitable for single-junction cells utilizing the visible spectrum. However, half of the solar energy available to the Earth lies in the infrared region. Inorganic quantum dot-based solar cells with a decent efficiency near 1.5 μm have been reported. Therefore, syntheses of narrow gap IV-VI (SnTe, PbS, PbSe, PbTe), II-IV (HgTe, $Cd_xHg_{1-x}Te$), and III-V (InAs) QDs have attracted significant attention and these materials have potential uses for a variety of other optical, electronic, and optoelectronic applications. SnTe with an energy gap of 0.18 eV at 300K can be used for IR photodetectors, laser diodes, and thermophotovoltaic energy converters.

Conventionally, small-scale batch processes have been used to synthesize nanocrystals. However, agglomerated, amorphous nanoparticles are obtained, and high-temperature annealing may be required to achieve a desired crystalline structure. For the synthesis of size and shape-controlled nanocrystals, a hot injection method is more suitable. Murray et al. pioneered a hot injection method to synthesize various metal and semiconductor nanocrystals, particularly those having diverse compositions, sizes and shapes. (Murray et al., *Annual Review of Materials Science,* 30:545-610 (2000).) In a typical 'hot injection' synthesis, organic ligands are used to passivate the surface of the nanoparticles to prevent particle aggregation. The reactants are injected into a hot coordinating solvent for rapid nucleation and a controlled growth process. Moreover, nanoparticles with monodispersed sizes and shapes can be synthesized by controlling the concentration and functional group of the organic ligands.

The synthesis of $CuInSe_2$ nanoparticles using the hot injection technique was first presented by Malik et al. in trioctylphosphine oxide (TOPO) and trioctylphosphine (TOP) by a two step reaction. (Malik et al., *Advanced Materials* 11:1441-4 (1999).) In this reaction, a TOP solution of CuCl and $InCl_3$ was injected into TOPO at 100° C. and then followed by a hot injection of trioctylphosphine selenide (TOPSe) at an elevated temperature of 330° C. to initiate the nucleation and growth of nanoparticles. Spherical $CuInSe_2$ nanoparticles of about 4.5 nm were synthesized according to the authors, and the powder X-Ray diffraction ("PXRD") data presented indicated that binary materials such as $Cu_2Se$ and $In_2O_3$ were present as by-products.

However, these hot injection methods rely primary on batch procedures, and typically require long processing time (hours to days), inert conditions (Schlenk line and/or glove box), and long heating and cooling procedures. In addition, reaction conditions may be difficult to control in these batch processes, resulting in poor homogeneous nucleation and poor temperature control when attempting to scale up the procedure. Thus, a need exists for an apparatus and method that can provide continuous, scalable and rapid synthesis of size- and/or shape-controlled nanocrystals.

SUMMARY

Disclosed herein are embodiments of a continuous-flow injection reactor suitable for continuous synthesis of materials, e.g., nanoparticles. In one embodiment, the continuous-flow injection reactor includes a mixing zone unit having a) an outer housing with a top inlet, a bottom outlet, and a side inlet positioned between and perpendicular to the top inlet and the bottom inlet, b) an injection tube inserted into the top inlet and positioned concentrically within the outer housing, the injection tube being of sufficient length to extend past the side inlet while terminating above the bottom outlet, and c) a mixing zone between a lower end of the injection tube and the bottom outlet of the mixing zone unit; a first fluid source operably coupled to the side inlet; a second fluid source operably coupled to the injection tube inserted into the top inlet; and a residence time unit, wherein the residence time unit has a diameter cooperatively dimensioned such that it can be removably coupled to the bottom outlet of the mixing zone unit.

In some embodiments, the continuous-flow injection reactor includes a removable fitting configured to removably couple the residence time unit to the mixing zone unit. The removable fitting may be configured further such that a heat-transfer fluid (e.g., water, silicon oil) can flow into the removable fitting through an inlet and flow out of the removable fitting through an outlet without directly contacting the mixing zone unit or the residence time unit.

In some embodiments, a heater is coupled to the mixing zone unit to provide heat to the mixing zone. In certain embodiments, the heater is a microwave heater.

In particular embodiments, the mixing zone unit includes a plurality of top inlets, and a plurality of injection tubes inserted through the plurality of top inlets. The plurality of injection tubes are positioned parallel to one another and perpendicular to the side inlet, and each of the plurality of injection tubes is of sufficient length to extend past the side inlet while terminating above the bottom outlet. In such embodiments, the second fluid source is coupled to each of the plurality of injection tubes.

In some embodiments, the residence time unit is a length of tubing. In certain embodiments, at least a portion of the residence time unit is in a temperature-controlled environment. Examples of a temperature-controlled environment include a water bath or an oil bath.

In other embodiments, the residence time unit includes a substantially cylindrical outer housing having a length "l" wherein the outer housing has a diameter cooperatively dimensioned such that it can be removably coupled to the mixing zone unit, and a plurality of tubes positioned within the outer housing, the plurality of tubes positioned parallel to one another and extending at least length "l" In some embodiments, the outer housing includes an inlet and an outlet. A heat-transfer fluid source can be operably coupled to the residence time unit outer housing inlet such that the heat-transfer fluid flows into the residence time unit through the outer housing inlet and flows out of the residence time unit through the outer housing outlet. The heat-transfer fluid has a temperature T1 when it flows into the residence time unit and a temperature T2 when it flows out of the residence time unit, and substantially fills the outer housing and surrounds the plurality of tubes as it flows through the residence time unit. In particular embodiments, the heat-transfer fluid that flows out through the residence time unit outer housing outlet is recycled to the outer housing inlet, and the heat-transfer fluid temperature is adjusted to temperature T1 before it is recycled to the outer housing inlet.

Embodiments of the disclosed continuous-flow injection reactors are suitable for continuous synthesis of nanoparticles. A first reactant solution is flowed into the mixing zone unit through the side inlet. The first reactant solution has a flow rate sufficient to substantially fill the outer housing of the mixing zone unit between the side inlet and the bottom outlet. A second reactant solution is flowed into the mixing zone unit through the tube, or plurality of tubes, inserted through the top inlet. The second reactant solution typically has a flow rate that is less than the first reactant solution. A fluid stream of the second reactant solution combines with the first reactant solution in the mixing zone, thereby producing a plurality of nucleated nanoparticles. The nucleated nanoparticles flow into and through the residence time unit, where the residence time unit is maintained at a desired temperature. The nanoparticles increase in size as they flow through the residence time unit. In some embodiments, the residence time unit includes an outer housing and a plurality of inner tubes positioned parallel to one another within the outer housing. The nucleated nanoparticles flow through the plurality of inner tubes. A heat-transfer fluid can be circulated through the residence time unit outer housing as the nucleated nanoparticles flow through the plurality of inner tubes. Nanoparticles are collected as they flow out of the residence time unit.

The foregoing and other objects, features, and advantages of the invention will become more apparent from the following detailed description, which proceeds with reference to the accompanying figures.

DETAILED DESCRIPTION

Figure 1:
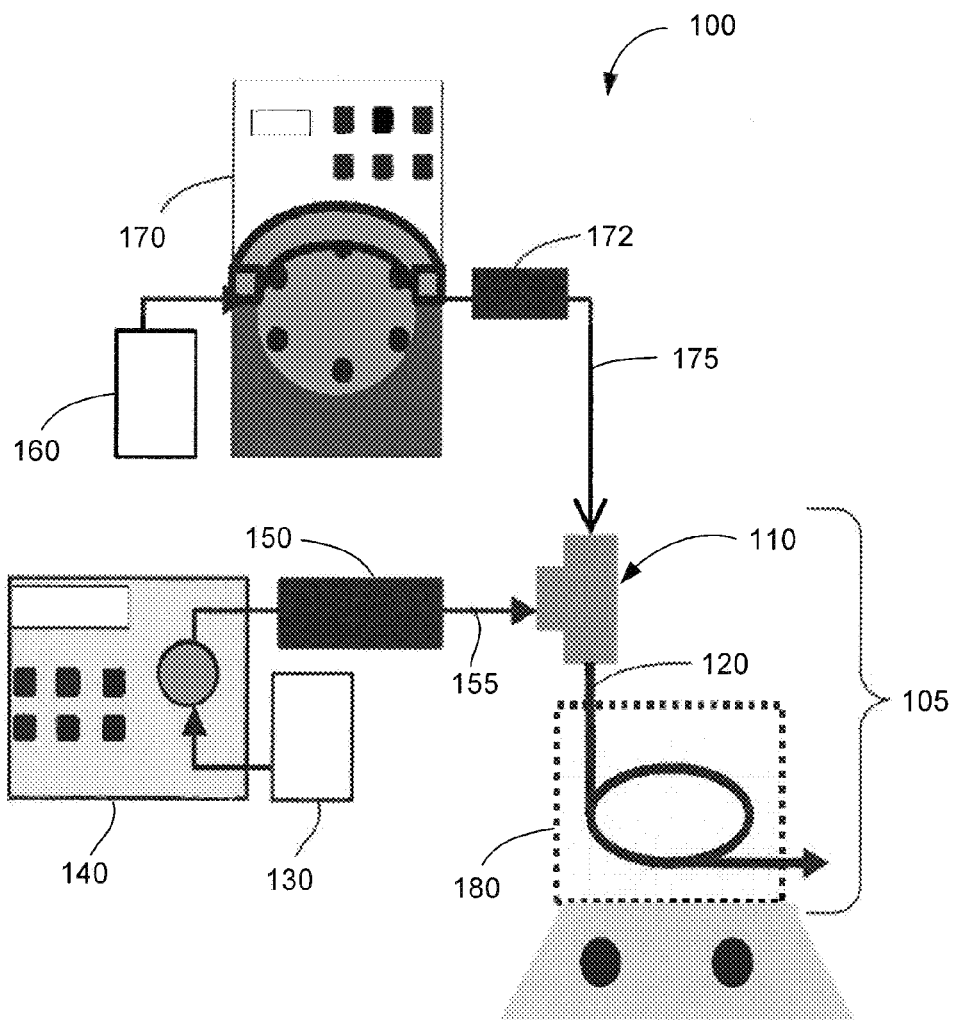
FIG. 1 is a schematic diagram of one embodiment of a continuous-flow injection reactor.

Embodiments of a continuous-flow injection reactor system and methods for its use in the synthesis of materials, such as nanocrystals, are disclosed. Embodiments of the disclosed continuous-flow injection reactor system overcome drawbacks of conventional batch synthesis including, but not limited to, low production rates, long heating, cooling and reaction times, the need for a Schlenk line and/or glove box, scalability, and combinations thereof.

I. Terms and Introduction

Unless otherwise noted, technical terms are used according to conventional usage. As used herein, the singular terms "a," "an," and "the" include plural referents unless context clearly indicates otherwise. Similarly, the word "or" is intended to include "and" unless the context clearly indicates otherwise. Also, as used herein, the term "comprises" means "includes." Hence "comprising A or B" means including A, B, or A and B. All publications, patent applications, patents, and other references mentioned herein are incorporated by reference in their entirety, unless context indicates otherwise. In case of conflict, the present specification, including explanations of terms, will control. In addition, the materials, methods, and examples are illustrative only and are not intended to limit the scope of the invention to the particular materials, methods and examples disclosed.

Unless otherwise indicated, all numbers expressing quantities of reactants, yields, properties such as composition, particle size, and so forth, as used in the specification or claims are to be understood as being modified by the term "about." Unless otherwise indicated, non-numerical properties as used in the specification or claims are to be understood as being modified by the term "substantially," meaning to a great extent or degree. Terms such as "perpendicular" and "parallel" are sometimes used in this application to refer to relative locations or orientations of a component or element, or of a motion or action. These terms refer to substantially perpendicular and substantially parallel situations, respectively unless otherwise disclosed. Accordingly, unless otherwise indicated, implicitly or explicitly, the numerical parameters and/or non-numerical properties set forth are approximations that may depend on the desired properties sought, and/or limits of detection under standard test conditions/methods, limitations of the processing method, and/or the nature of the parameter or property. When directly and explicitly distinguishing embodiments from discussed prior art, the embodiment numbers are not approximates unless the word "about" is recited.

In order to facilitate review of this disclosure, the following explanations of specific terms are provided.

Anisotropy is the property of being directionally dependent, whereas isotropy is the property of being homogeneous in all directions. Thus, isotropic particles have identical properties in all directions, whereas the properties of anisotropic particles depend on the direction. For example, wood is anisotropic due to its grain, and the strength of the wood is stronger with the grain than against the grain. Spherical nanoparticles are isotropic; rod-shaped nanoparticles are anisotropic.

CIS, CISS: Refers to semiconductor materials comprising copper, indium, and selenium and/or sulfur. The materials based on $CuInSe_2$ that are of interest for photovoltaic applications include several elements from groups I, III and VI in the periodic table. These semiconductors are especially attractive for thin film solar cell application because of their high optical absorption coefficients and versatile optical and electrical characteristics, which can be tuned for a specific need in a given device.

CIGS: Certain disclosed embodiments of the present invention concern CIGS materials, which refers to semiconductor materials comprising copper, indium, gallium, and selenium or sulfur. These materials are believed to be solid solutions of copper indium selenide ("CIS" materials) and copper gallium selenide, and often are written as $Cu(In,Ga)Se_2$, or as $CuIn_xGa_{(1-x)}Se_2$, where the value of x can vary from 1 (pure copper indium selenide) to 0 (pure copper gallium selenide). Certain CIGS compounds are tetrahedrally-bonded semiconductors, with the chalcopyrite crystal structure, and a bandgap varying continuously with x from about 1.0 eV (for copper indium selenide) to about 1.7 eV (for copper gallium selenide).

CIGSS: Refers to semiconductor materials comprising copper, indium, gallium and selenium and sulfur. Exemplary compounds include those having a formula $Cu(In,Ga)(SeS)_2$.

Chalcogen: Refers to compounds of Group 16 of the periodic table (old-style: VIB or VIA), sometimes referred to as the oxygen family, and includes the elements oxygen (O), sulfur (S), selenium (Se), tellurium (Te), the radioactive element polonium (Po), and the synthetic element ununhexium (Uuh). Sulfur, selenium and tellurium are chalcogens of primary interest for disclosed embodiments of the present invention.

Chalcogenide: Typically refers to compounds of the chalcogens. Oxides often are not considered chalcogenides, but as used herein "chalcogenide" may refer to oxides, unless particular context of this application indicates otherwise.

NC: Nanocrystal.

Nucleation: A process by which crystals are formed from liquids, supersaturated solutions, or saturated vapors. As used herein, nucleation refers to the initial formation of particles when two or more liquid reactant streams are combined.

OA: Oleic acid.

Ostwald ripening: A process in which many small crystals initially form, but then disappear as larger crystals grow. Smaller crystals have a higher solubility than larger crystals due to the larger surface area to volume ratio. The surface molecules are energetically less stable, thus producing an overall higher energy state in small crystals as compared to larger crystals. Over time, smaller crystals re-dissolve and larger crystals continue to grow because they are energetically favored.

Photovoltaic: A photovoltaic material produces a voltage when exposed to radiant energy, particularly light.

Semiconductor: A material having electrical conductivity between those of a conductor and an insulator. Exemplary semiconductors include: Group III-V semiconductors, such as aluminum antimonide (AlSb), aluminum arsenide (AlAs), aluminum nitride (AlN), aluminum phosphide (AlP), boron nitride (BN), boron phosphide (BP), boron arsenide (BAs), gallium antimonide (GaSb), gallium arsenide (GaAs), gallium nitride (GaN), gallium phosphide (GaP), indium antimonide (InSb), indium arsenide (InAs), indium nitride (InN), indium phosphide (InP); Group III-V ternary semiconductor alloys, such as aluminum gallium arsenide (AlGaAs, $Al_xGa_{1-x}As$), indium gallium arsenide (InGaAs, $In_xGa_{1-x}As$), indium gallium phosphide (InGaP), aluminum indium arsenide (AlInAs), aluminum indium antimonide (AlInSb), gallium arsenide nitride (GaAsN), gallium arsenide phosphide (GaAsP), aluminum gallium nitride (AlGaN), aluminum gallium phosphide (AlGaP), indium gallium nitride (InGaN), indium arsenide antimonide (InAsSb), indium gallium antimonide (InGaSb); Group III-V quaternary semiconductor alloys, such as aluminum gallium indium phosphide (AlGaInP, also InAlGaP, InGaAlP, AlInGaP), aluminum gallium arsenide phosphide (AlGaAsP), indium gallium arsenide phosphide (InGaAsP), aluminum indium arsenide phosphide (AlInAsP), aluminum gallium arsenide nitride (AlGaAsN), indium gallium arsenide nitride (InGaAsN), indium aluminum arsenide nitride (InAlAsN), gallium arsenide antimonide nitride (GaAsSbN); Group III-V quinary semiconductor alloys, such as gallium indium nitride arsenide antimonide (GaInNAsSb), gallium indium arsenide antimonide phosphide (GaInAsSbP); Group II-VI semiconductors, such as cadmium selenide (CdSe), cadmium sulfide (CdS), cadmium telluride (CdTe), zinc oxide (ZnO), zinc selenide (ZnSe), zinc sulfide (ZnS), zinc telluride (ZnTe); Group II-VI ternary alloy semiconductors, such as cadmium zinc telluride (CdZnTe, CZT), mercury cadmium telluride (HgCdTe), mercury zinc telluride (HgZnTe), mercury zinc selenide (HgZnSe); Group I-VII semiconductors, such as cuprous chloride (CuCl); Group IV-VI semiconductors, such as lead selenide (PbSe), lead sulfide (PbS), lead telluride (PbTe), tin sulfide (SnS), tin telluride (SnTe); IV-VI ternary semiconductors, such as lead tin telluride (PbSnTe), thallium tin telluride ($Tl_2SnTe_5$), thallium germanium telluride ($Tl_2GeTe_5$); Group V-VI semiconductors, such as bismuth telluride ($Bi_2Te_3$); Group II-V semiconductors, such as cadmium phosphide ($Cd_3P_2$), cadmium arsenide ($Cd_3As_2$), cadmium antimonide ($Cd_3Sb_2$), zinc phosphide ($Zn_3P_2$), zinc arsenide ($Zn_3As_2$), zinc antimonide ($Zn_3Sb_2$).

The present invention is useful for making Group semiconductors. I refers to Group IB, the elements Cu, Ag and Au. III refers to Group IIIA elements, B, Al, Ga, In and Ti. VI refers to Group VIA, that is elements O, S, Se, Te and Po. A comma often is used between two elements, for example (Se, S), (In, Ga), where (Se, S), is short hand for ($Se_{i-y}S_y$). Group alloys, such as $CuInSe_2$, $CuGaSe_2$, $CuInS_2$, CGS, CIS and CIGS are useful for forming absorber layers in thin film photovoltaic cells or devices. Semiconductor films comprising Group alloys wherein the alloy includes Ga in combination with another Group III element produce semiconductor films with higher band gap values and subsequently, in solar/photovoltaic cell devices, with higher open-circuit voltages and reduced short circuit currents.

Solar cell: A semiconductor device that converts sunlight into electric energy.

TOP: Tri-n-octylphosphine.

XRD: XRD (powder X-ray diffraction) is a technique used to characterize the crystallographic structure, crystallite size (grain size), and preferred orientation in polycrystalline or powdered solid samples. Powder diffraction is commonly used to identify unknown substances, by comparing diffraction data against a database maintained by the International Centre for Diffraction Data, or to confirm that a synthesized material is the desired material.

II. Injection Reactors

Embodiments of the disclosed injection reactors have several advantages over conventional batch syntheses. One advantage is the efficient heat and mass transfer conferred by the smaller components and reaction volumes. When synthesizing nanoparticles, efficient heat transfer facilitates size and shape control of the particles. Another advantage is reduced reaction time. Whereas conventional batch syntheses generally have long reaction times measured in hours or days, nanoparticle syntheses performed with embodiments of the disclosed injection reactors have reaction times measured in minutes. A shorter reaction time not only provides higher throughput but also provides better size control by avoiding aggregation. The combination of smaller volumes and shorter reaction times also facilitates improved composition control and purity of the product nanoparticles. Embodiments of the disclosed injection reactors can be operated in the ambient environment, whereas conventional batch syntheses typically are performed under an inert atmosphere. Particular embodiments of the disclosed injection reactors also are scalable, as discussed in further detail below. Furthermore, embodiments of the disclosed injection reactors are easily assembled and disassembled to facilitate cleaning and/or parts substitution/replacement.

FIG. 1 illustrates one embodiment of a complete continuous-flow injection reactor system 100. System 100 includes an injection reactor 105 comprising a mixing zone unit 110 and a residence time unit 120. In the embodiment shown, mixing zone unit 110 is t-shaped. However, mixing zone unit 110 may have any other suitable configuration that allows for two or more fluid streams to enter mixing zone unit 110, and for at least one fluid stream to exit mixing zone unit 110. For example, mixing zone unit 110 may be y-shaped. A first reactant 130 flows into a first pump 140, which controls the flow rate of first reactant 130. Reactant 130 then flows through heating means 150, through conduit 155, and into mixing zone unit 110. In some embodiments, heating means 150 is absent. A second reactant 160 flows into a second pump 170, which controls the flow rate of reactant 160. Reactant 160 then flows through heating means 170, through conduit 175, and into mixing zone unit 110. In some embodiments, heating means 170 is absent. Heating means 150, 170 may be any suitable heater, including but not limited to thermal, microwave, and ultrasonic heaters. Reactants 130 and 160 are combined within mixing zone unit 110. In certain embodiments, particle nucleation ensues in the combined stream. The combined stream then flows into a residence time unit 120. At least a portion of residence time unit 120 may be positioned in a temperature-controlled environment, e.g., a water or oil bath 180. As the combined stream flows through the residence time unit 120, nucleated particles can increase in size as they continue to react with monomers in the combined stream. The size and shape of the particles can be controlled by varying the temperature of the reactant streams within the mixing zone unit 110 and the temperature of the combined stream flowing through the residence time unit 120. Particle size is further controlled by the length of time required for the nanoparticles to pass completely through the residence time unit 120.

In exemplary embodiments, the injection reactor is utilized for nanoparticle synthesis. With respect to nanoparticle syntheses, the term "nucleation" may be used in place of the term "mixing." Hence, the mixing zone unit may be referred to as a nucleation zone unit hereinafter, and the mixing zone similarly may be referred to as a nucleation zone. A person of ordinary skill in the art of reactor synthesis will understand that the terms mixing and nucleation may be used interchangeably in disclosed embodiments wherein mixing reactants effects nucleation of nanoparticles.

Figure 2A:
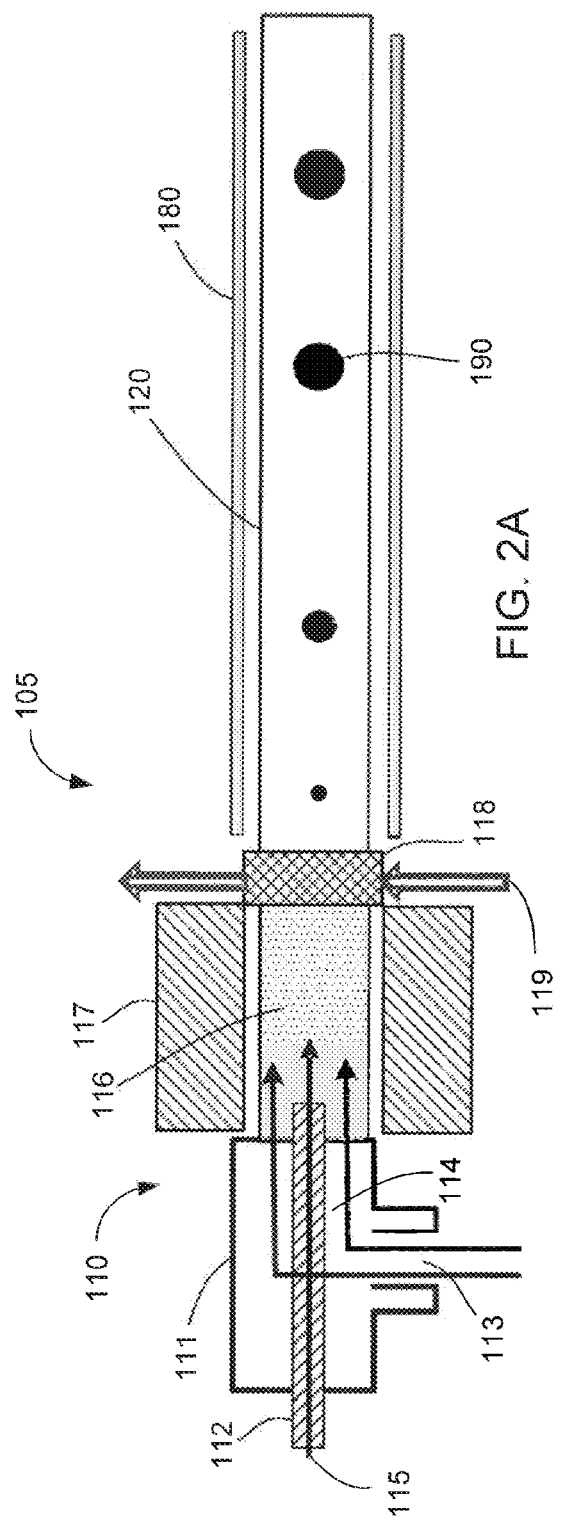
FIG. 2A is a schematic diagram of one embodiment of an assembled continuous-flow injection reactor.
Figure 3:
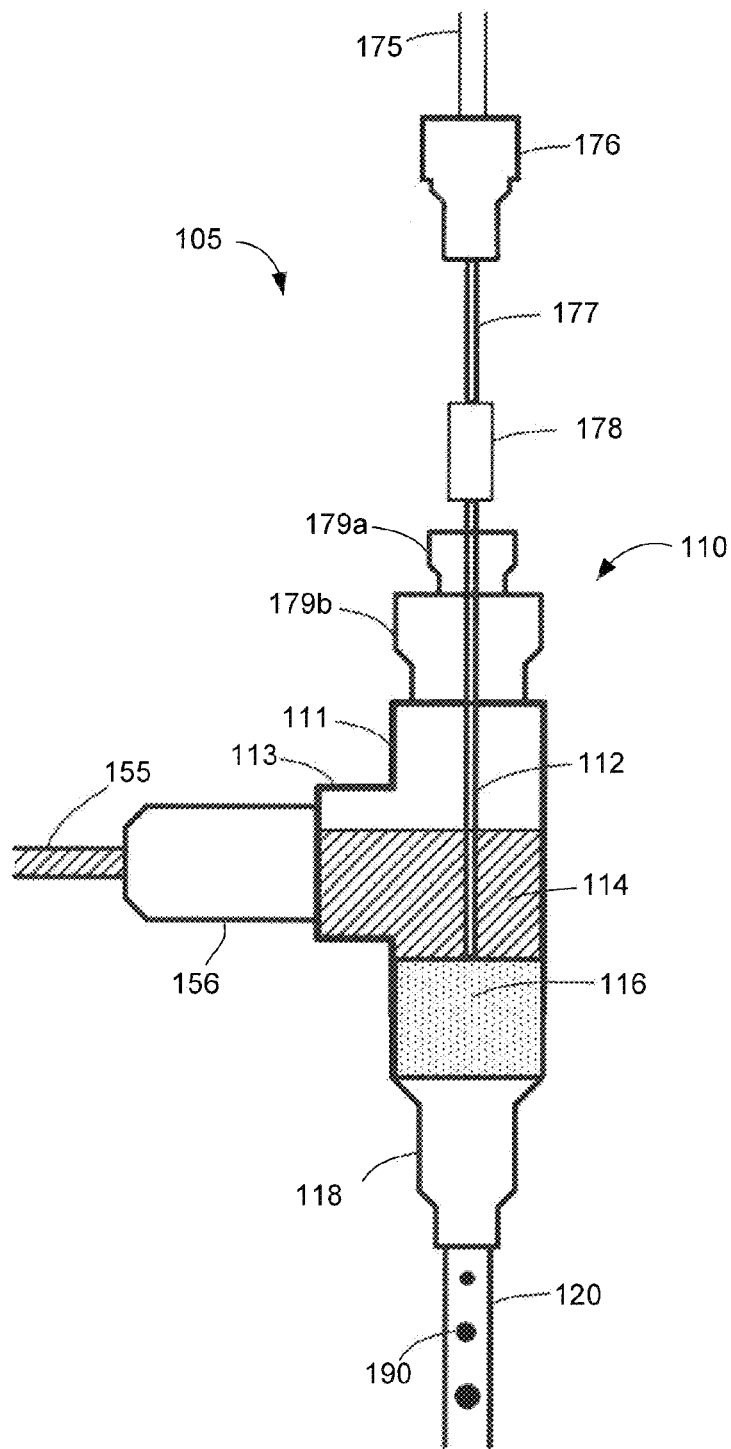
FIG. 3 is a schematic diagram of the mixing zone unit of FIG. 2A.

A. Injection Reactor with Single Injection-Tube Nucleation Zone Unit and Single-Tube Residence Time Unit FIG. 2A illustrates one embodiment of an injection reactor 105. The injection reactor includes a nucleation zone unit 110 and a residence time unit 120 cooperatively shaped and dimensioned such that it can be removably coupled to nucleation zone 110. With references to FIGS. 2A and 3, in one embodiment, nucleation zone unit 110 is generally t-shaped, and includes an outer housing 111 and a concentric injection tube 112. As previously discussed, other arrangements of nucleation zone unit 110 may be equally suitable. For example, nucleation zone unit 110 may be y-shaped. Suitable materials for outer housing 111 include stainless steel. A first reactant flows into nucleation zone unit 110 through a side inlet 113 and into an inner portion 114 of outer housing 111, surrounding concentric injection tube 112. The first reactant optionally passes through a heater 150 (see FIG. 1) before flowing into nucleation zone unit 110 through side inlet 113. The volume and flow rate of the first reactant is sufficient to substantially fill inner portion 114 below side inlet 113 and surround injection tube 112. A second reactant flows into nucleation zone unit 110 through the inner portion 115 of concentric injection tube 112. The second reactant optionally passes through a heater 172 (see FIG. 1) before flowing into injection tube 112. Injection tube 112 terminates in nucleation zone 116. As the second reactant exits concentric injection tube 112, it is combined with the first reactant in nucleation zone 116. As the first and second reactants mix and react in zone 116, nanoparticle nucleation occurs. In some embodiments, a heater 117 is coupled to nucleation zone 116. Heater 117 can be any suitable heater, including but not limited to thermal, microwave, and ultrasonic heaters. In particular embodiments, heater 117 is a microwave heater.

Other arrangements (not shown) also may be suitable. For example, the nucleation zone unit may be y-shaped with the side inlet positioned at an angle less than 90° relative to the nucleation zone unit body. In another arrangement, it is contemplated that a first reactant could flow in through a top inlet of the nucleation zone unit. A second reactant could flow in through an injection tube inserted into a side inlet, wherein the injection tube has a curved, or bent, configuration such that it terminates in the mixing zone. In yet another arrangement, the nucleation zone unit may comprise a top inlet and a bottom outlet with an injection tube inserted through the top inlet. In such an arrangement, the top inlet may be of sufficient diameter to provide an annular passageway surrounding the injection tube, such that a first reactant can flow into the nucleation zone unit via an annular passageway surrounding the injection tube.

Nucleation zone unit 110 is removably coupled to cooperatively-dimensioned residence time unit 120 via a removable fitting 118. In some embodiments, fitting 118 is configured such that a heat-transfer liquid 119 (e.g., water) can flow through fitting 118 to warm or cool the fluid stream as it exits nucleation zone 116 and enters residence time unit 120. Fitting 118 is configured such that the heat-transfer liquid 119 does not directly contact nucleation zone unit 110 or residence time unit 120. In FIG. 2A, residence time unit 120 comprises a single conduit of defined length, e.g., a length of polymer tubing. At least a portion of residence time unit 120 may be positioned in a temperature-controlled environment 180, e.g., a water or oil bath. As nanoparticles 190 move through residence time unit 120, their size increases.

In some embodiments, the first and/or the second reactant is heated before flowing into nucleation zone unit 110. More typically, the first reactant is heated before it flows into nucleation zone unit 110 through side inlet 113. In such embodiments, the injection reactor is termed a "hot-injection" reactor.

In a working embodiment, a female t-pipe constructed of 316 stainless steel (available from Grainger, Inc.) was used for outer housing 111. Outer housing 111 (exclusive of side inlet 113) had an outer diameter of 3.175 mm and an inner diameter of 1.588 mm. Outer housing 111 was connected to residence time unit 120 with a 316L stainless steel Swagelok tube fitting (Swagelok Company) 118. Residence time unit 120 was constructed from VITON® tubing with an outer diameter of 3.2 mm and an inner diameter of 1.6 mm. Stainless steel tubing 155 was connected to side inlet 113 with a second Swagelok tube fitting 156 of either brass or stainless steel. Injection tube 112 was constructed of stainless steel tubing with an outer diameter of 0.79 mm and an inner diameter of 0.38 mm. TYGON® tubing 175 was connected to a narrower (0.79 mm) piece of PTFE tubing 177 with a reducing union 176. Narrow tubing 177 was connected to injection tube 112 via a fitting 178 comprising a low-pressure union and two 1.6-mm nuts. Injection tube 112 was inserted through a pair of NPT adapters 179a,b coupled to outer housing 111. A person of ordinary skill in the art of nanoparticle synthesis will understand that materials for the apparatus are selected based, at least in part, on their compatibility with the reactant solutions and the products made. Precise measurements (e.g., inner and outer diameters, length) also may depend upon the particular application and reaction conditions.

Figure 2B:
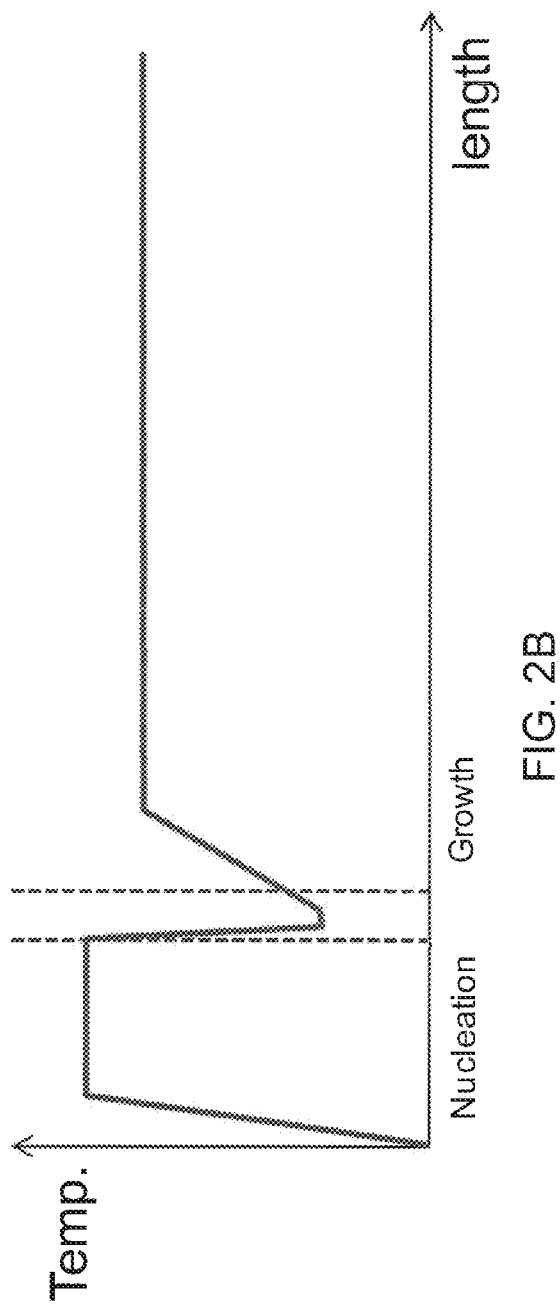
FIG. 2B is a graph of temperature versus length depicting the temperature variation and nanoparticle growth in the reactor of FIG. 2A.

FIG. 2B is a graph illustrating the relative temperatures and reaction profile of the combined reactant streams as they flow through injection reactor 105. FIG. 2B is aligned with FIG. 2A to show the relationship between temperature and the components of injection reactor 105. As shown in FIG. 2B, temperature increases in nucleation zone 116 and nanoparticle nucleation occurs. As the combined reactant streams pass through cooled fitting 118, the temperature drops. The temperature rises again as the reactant streams pass through residence time unit 120 with concomitant nanoparticle growth.

Figure 4:
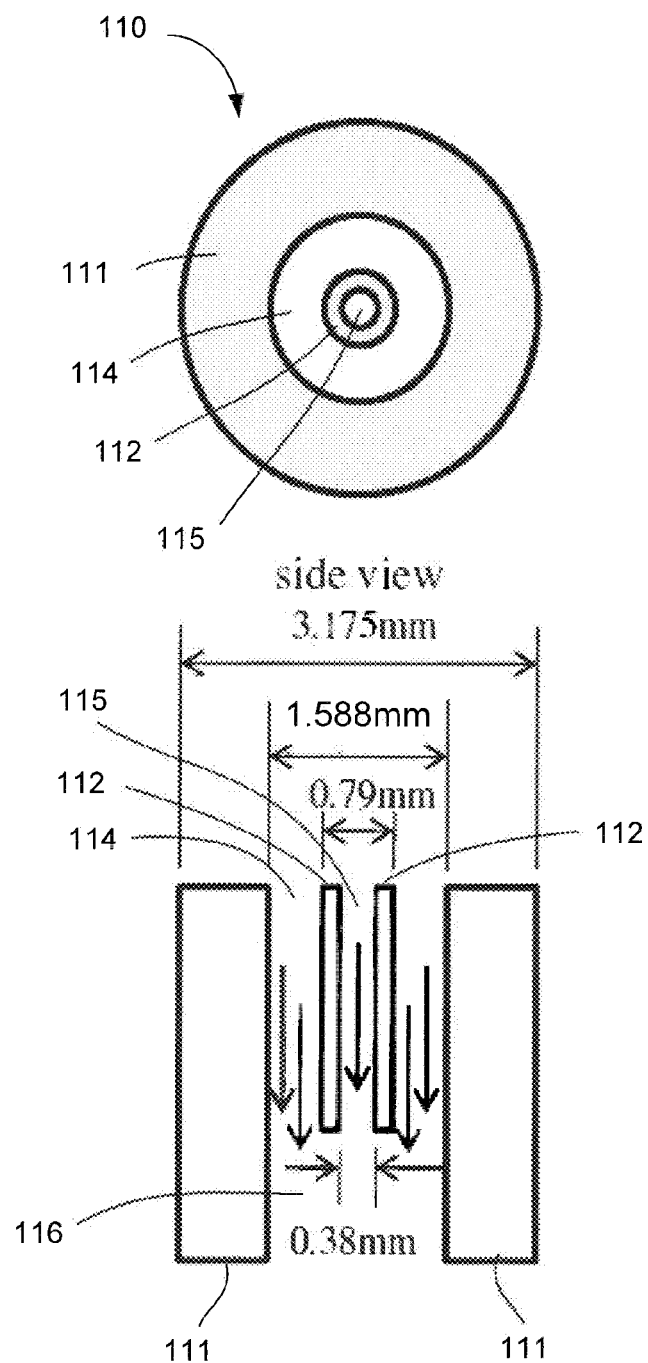
FIG. 4 is a plan view and a side view of the mixing zone unit of FIG. 2A.

FIG. 4 is a schematic diagram illustrating an exemplary configuration of nucleation zone unit 110. A top view shows the concentric relationship between outer housing 111 and concentric injection tube 112. As discussed above, a first reactant flows through inner portion 114 of outer housing 111, and a second reactant flows through the inner portion 115 of concentric injection tube 112. The side view illustrates the relative dimensions of one embodiment of nucleation zone unit 110. With respect to FIGS. 2A, 3 and 4, the illustrated arrangement produces a narrow stream (e.g., having a diameter less than about 0.25× the diameter of mixing zone unit 110) of the second reactant flowing through the inner portion 115 of concentric injection tube 112. In a working embodiment, the narrow stream had a diameter of about 0.38 mm. The narrow stream then mixes with a larger volume of the first reactant flowing through inner portion 114 in nucleation zone 116.

Figure 5:
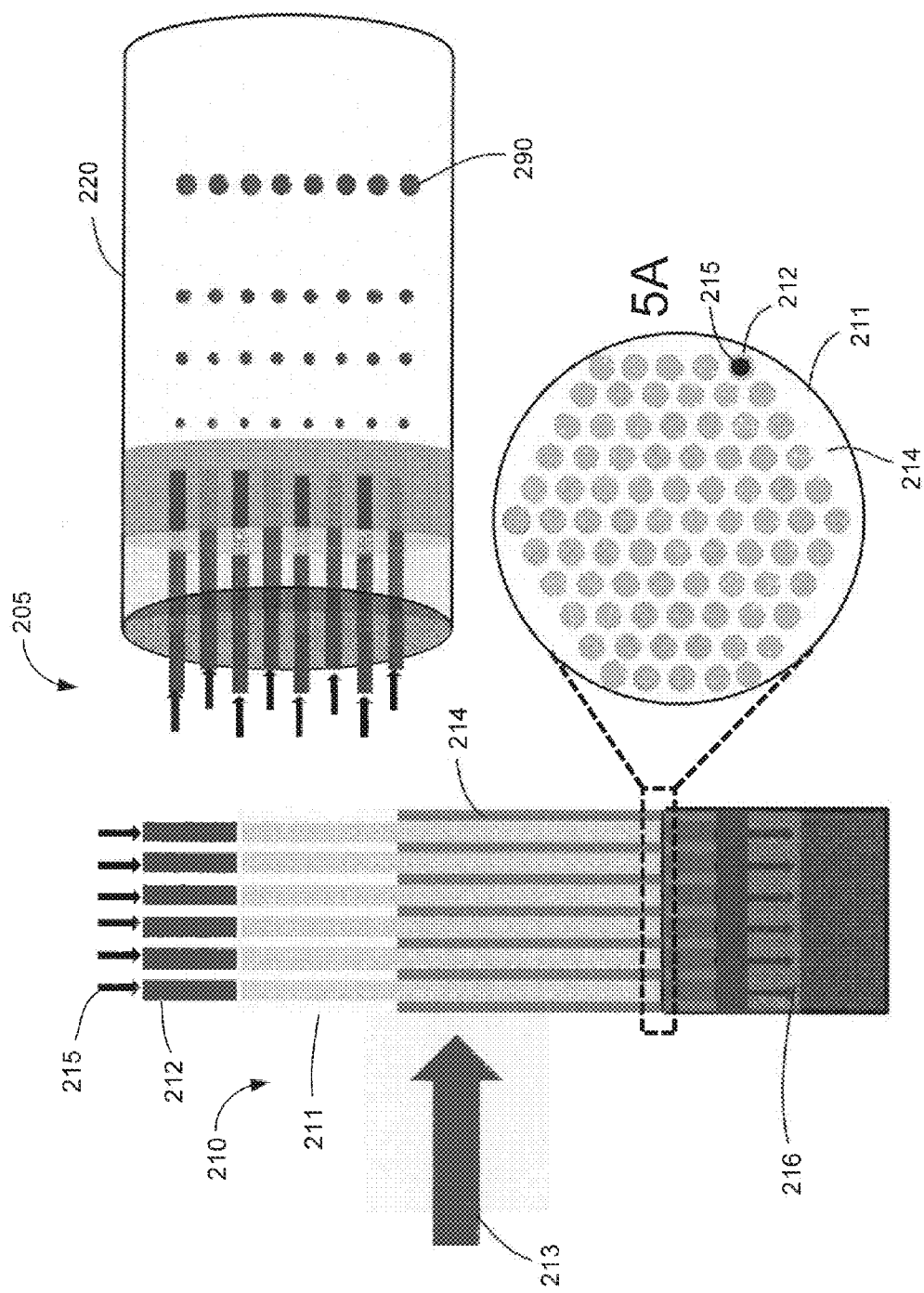
FIG. 5 is a schematic diagram of one embodiment of a disassembled continuous-flow injection reactor

B. Injection Reactor with Plural-Injection-Tube Nucleation Zone Unit and Single-Tube Residence Time Unit FIG. 5 illustrates one embodiment of a disassembled injection reactor 205. The injection reactor includes a nucleation zone unit 210 and a residence time unit 220 cooperatively shaped and dimensioned such that it can be removably coupled to nucleation zone 210. In an embodiment, nucleation zone unit 210 is generally t-shaped, and includes an outer housing 211 and a plurality of inner injection tubes 212. The inset portion 5A of FIG. 5 illustrates an exemplary arrangement of injection tubes 212 within outer housing 211. Although not expressly shown, it is understood that each of injection tubes 212 in inset portion 5A include an inner portion 215 through which a fluid stream can flow. A person of ordinary skill in the art will understand that the number of injection tubes 212 and their arrangement relative to one another may vary.

A first reactant flows into nucleation zone unit 210 through a side inlet 213. The first reactant optionally passes through a heater before flowing into nucleation zone unit 210 through side inlet 213. The volume and flow rate of the first reactant typically is sufficient to substantially fill the open space 214 within outer housing 211 below side inlet 213 and surround the plurality of inner injection tubes 212. A second reactant flows into nucleation zone unit 210 through the inner portions 215 of inner injection tubes 212. The second reactant optionally passes through a heater before flowing into nucleation zone unit 210. Injection tubes 212 terminate in nucleation zone 216. As the second reactant exits injection tubes 212, it is combined with the first reactant in nucleation zone 216. As the first and second reactants mix and react in nucleation zone 216, nanoparticle nucleation occurs.

Nucleated nanoparticles exit the nucleation zone 216 and pass into residence time unit 220. Residence time unit 220 comprises a single conduit of defined length, e.g., a length of tubing. Typically, at least a portion of residence time unit 220 is positioned in a temperature-controlled environment, e.g., a water or oil bath (not shown). As nanoparticles 290 move through residence time unit 220, their size increases.

Figure 6:
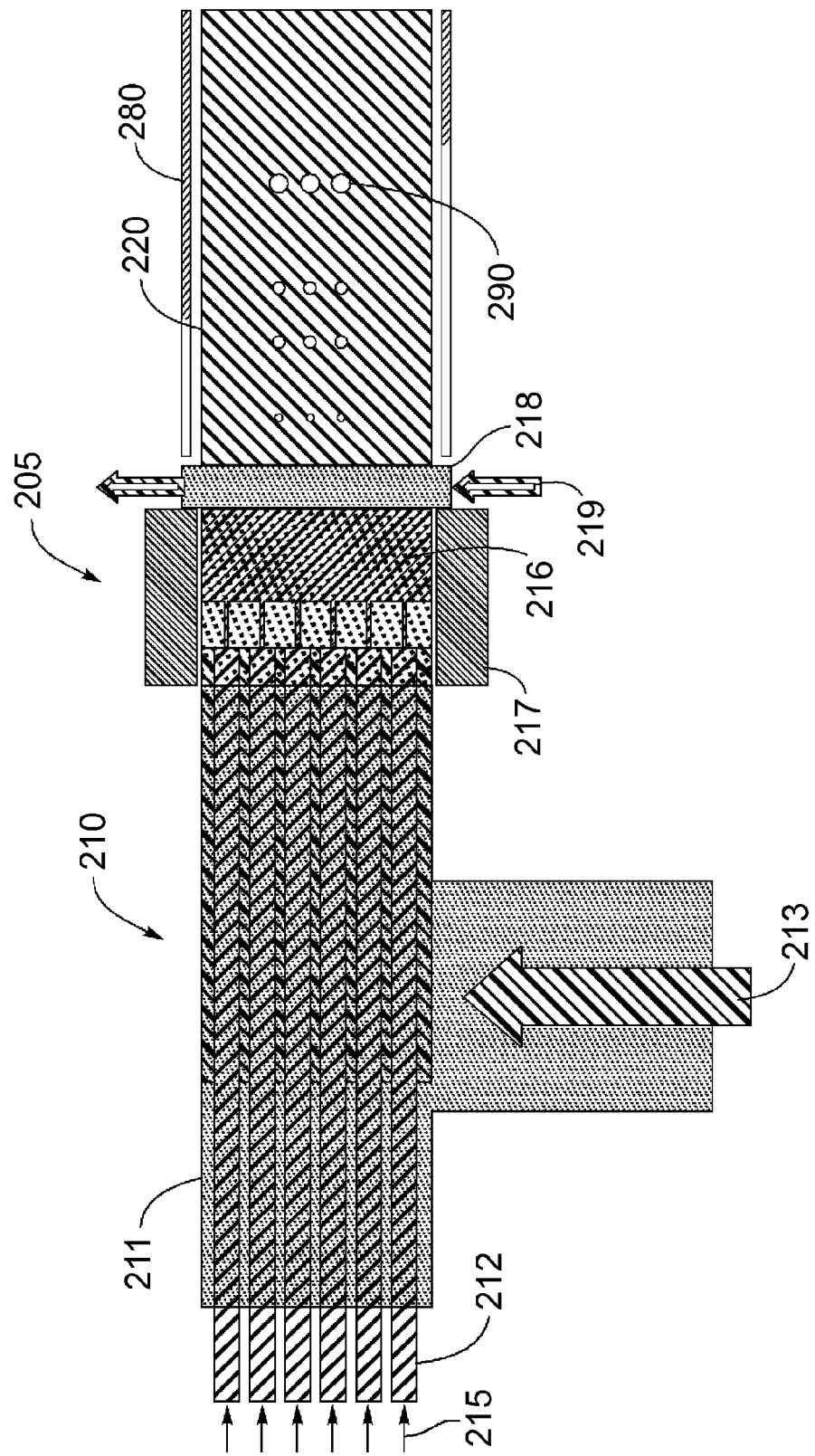
FIG. 6 is a schematic diagram of the assembled injection reactor of FIG. 5.

FIG. 6 illustrates one embodiment of assembled injection reactor 205. In some embodiments, a heater 217 is coupled to nucleation zone 216. Heater 217 can be any suitable heater, including but not limited to thermal, microwave, and ultrasonic heaters. Nucleation zone unit 210 is removably coupled to cooperatively-dimensioned residence time unit 220 via a fitting 218. In some embodiments, fitting 218 is configured such that a cooling liquid 219 (e.g., water) can flow through fitting 218 to cool the fluid stream as it exits nucleation zone 216 and enters residence time unit 220. Residence time unit 220 is a single tube, at least a portion of which is immersed in a temperature-controlled environment 280, e.g., a water or oil bath. As nanoparticles 290 pass through residence time unit 220, their size increases.

Advantages of injection reactor 205 compared to injection reactor 105 include the ability to scale up synthesis of nanoparticles. Multiple streams of the second reactant are injected through inner injection tubes 212 into the first reactant within the nucleation zone 216. The overall size of injection reactor 205 can be increased to accommodate the plurality of inner injection tubes 216, with a concomitant increase in the volumes of the first and second reactants that can flow into and through nucleation zone unit 210. The increased reactant volumes produce an increased number of nanoparticles.

Figure 7:
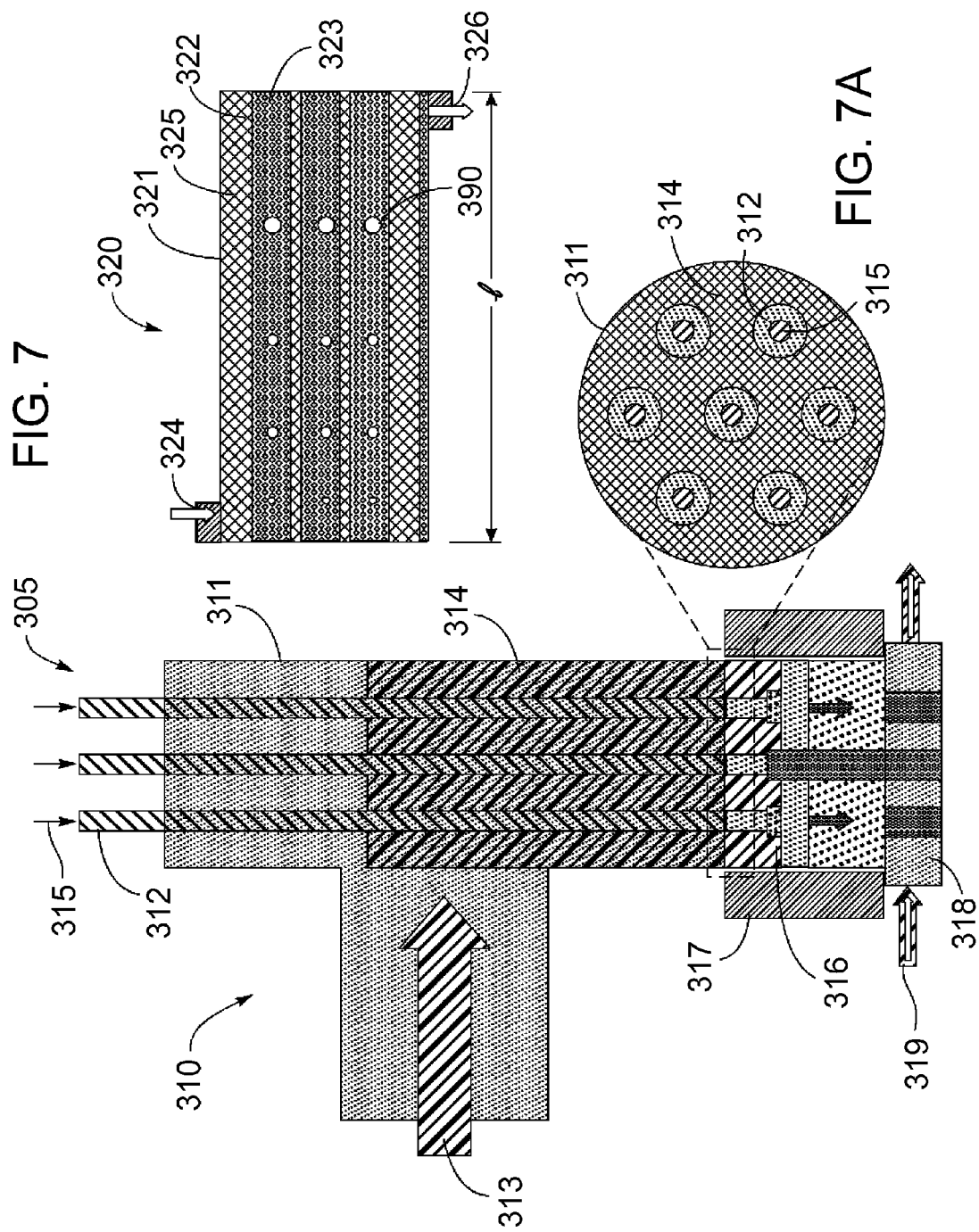
FIG. 7 is a schematic diagram of one embodiment of a disassembled continuous-flow injection reactor.

C. Injection Reactor with Plural-Tube Nucleation Zone Unit and Plural-Tube Residence Time Unit FIG. 7 illustrates one embodiment of a disassembled injection reactor 305. The injection reactor includes a nucleation zone unit 310 and a residence time unit 320 cooperatively shaped and dimensioned such that it can be removably coupled to nucleation zone 310. Nucleation zone unit 310 is generally t-shaped, and includes an outer housing 311 and a plurality of inner injection tubes 312. The inset portion 7A of FIG. 7 illustrates an exemplary arrangement of injection tubes 312 within outer housing 311. Each of injection tubes 312 in inset portion 7A include an inner portion 315 through which a fluid stream can flow. A person of ordinary skill in the art will understand that the number of injection tubes 312 and their arrangement relative to one another may vary. The number of injection tubes 312 may be greater or fewer than illustrated. Similarly, tubes 312 may have arrangements within outer housing 311 other than the arrangement illustrated.

A first reactant flows into nucleation zone unit 310 through a side inlet 313. The first reactant optionally passes through a heater before flowing into nucleation zone unit 310 through side inlet 313. The volume and flow rate of the first reactant is sufficient to substantially fill the open space 314 within outer housing 311 below side inlet 313 and surround the plurality of inner injection tubes 312. A second reactant flows into nucleation zone unit 310 through the inner portions 315 of injection tubes 312. The second reactant optionally passes through a heater before flowing into nucleation zone unit 310. Injection tubes 312 terminate in nucleation zone 316. As the second reactant exits injection tubes 312, it is combined with the first reactant in nucleation zone 316. As the first and second reactants mix and react in nucleation zone 316, nanoparticle nucleation occurs. In some embodiments, a heater 317 is coupled to nucleation zone 316. Heater 317 can be any suitable heater, including but not limited to thermal, microwave, and ultrasonic heaters. As shown in FIG. 7, a fitting 318 may be coupled to a lower end of nucleation zone unit 310 such that residence time unit 320 may be removably coupled to nucleation zone unit 310. In some embodiments, fitting 318 is configured such that a cooling fluid (e.g., water) can flow through fitting 318.

Nucleated nanoparticles exit the nucleation zone 316 and pass into residence time unit 320. Residence time unit 320 comprises an outer housing 321 having a length "l," and a plurality of inner tubes 322 positioned within outer housing 321. In some embodiments, residence time unit 320 is cylindrical in shape. Nucleated nanoparticles flow into residence time unit 320 via inner portions 323 of inner tubes 322. Thus, the flow of nucleated nanoparticles is split into a plurality of narrow streams flowing through inner tubes 322. As nanoparticles 390 pass through the inner tubes 322, the nanoparticles increase in size.

A circulating heat-transfer fluid (e.g., water, oil) at a first temperature T1 flows into residence time unit 320 through port 324. The circulating fluid substantially fills the inner space 325 within housing 321 and surrounds the plurality of inner tubes 322. The circulating fluid exits residence time unit 320 via port 326. Upon its exit, the circulating fluid is at a second temperature T2. In some embodiments, T1≥T2. In other embodiments, T1≤T2. In some embodiments, the circulating fluid is recycled. The circulating fluid passes through a heater, or cooler, as necessary, such that its temperature returns to T1 before re-entering residence time unit 320. In certain embodiments, the circulating fluid flow is reversed, with the circulating fluid entering via port 326 and exiting via port 324.

Figure 8:
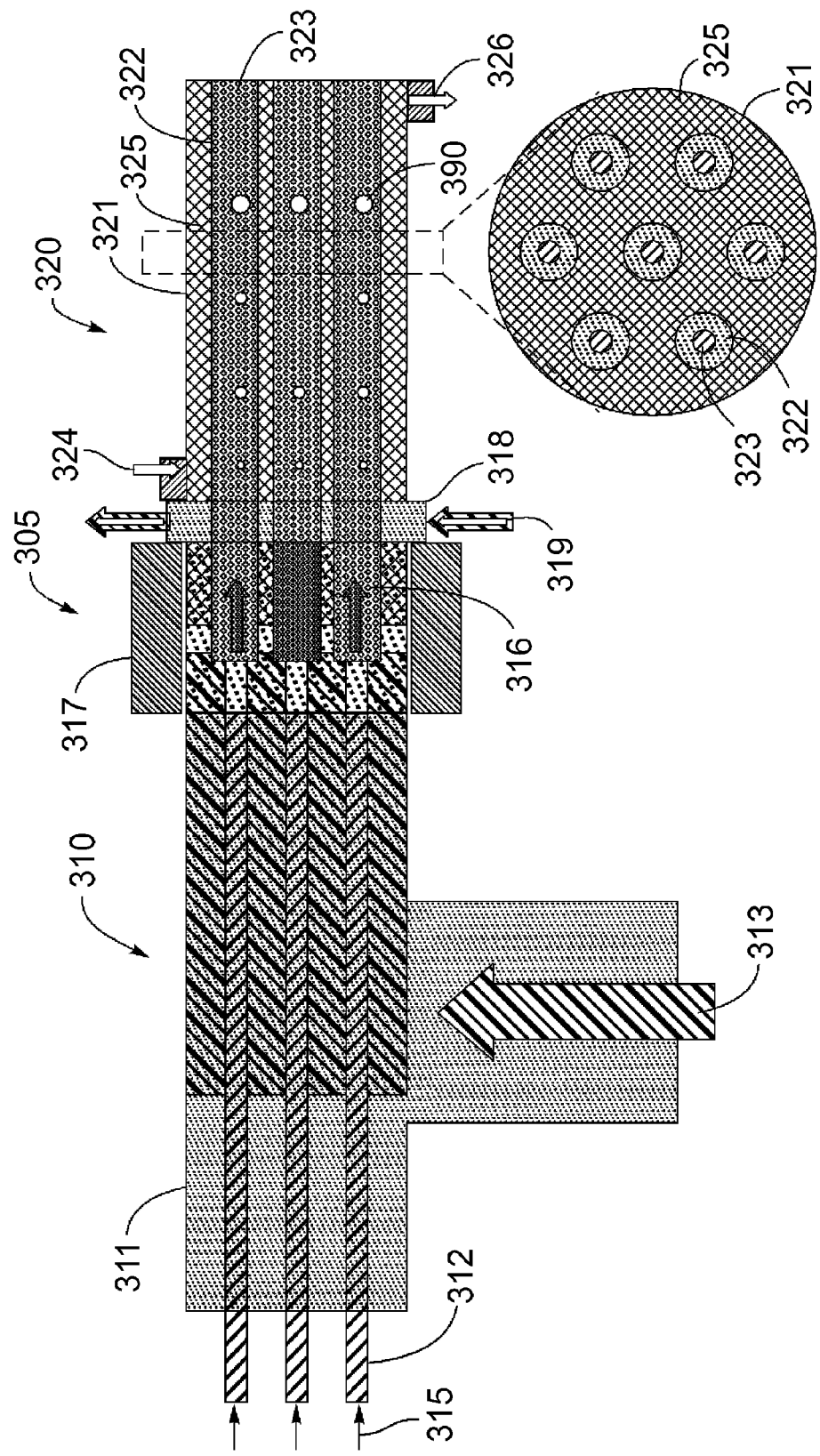
FIG. 8 is a schematic diagram of the assembled injection reactor of FIG. 7.

FIG. 8 illustrates one embodiment of assembled injection reactor 305. Nucleation zone unit 310 and residence time unit 320 are removably coupled via fitting 318. Inset 8A is a cross-section of residence time unit 320 illustrating one exemplary arrangement of inner tubes 322. A person of ordinary skill in the art will understand that the number of inner tubes 322 and their arrangement relative to one another may vary.

Figure 9:
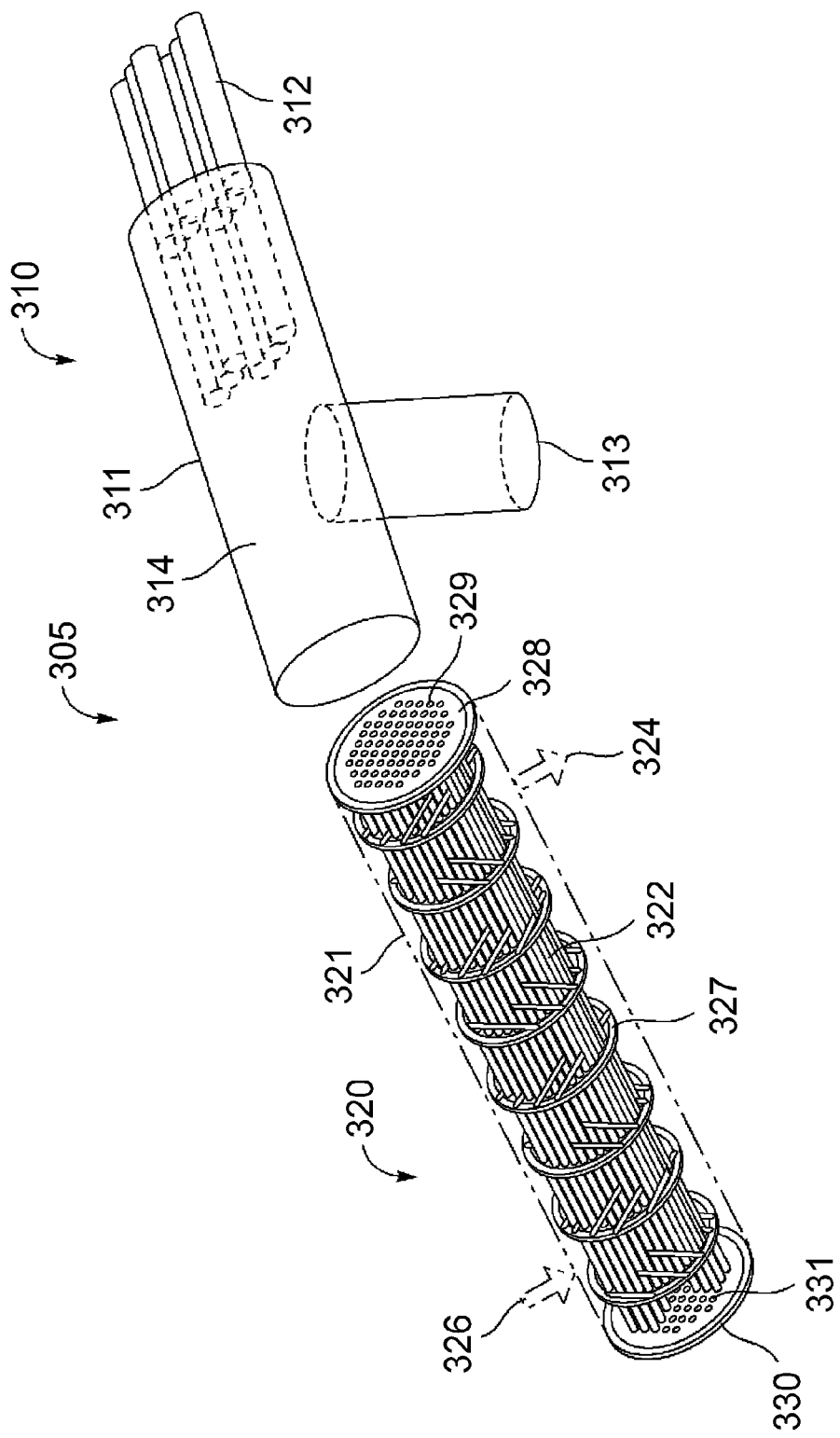
FIG. 9 is a perspective view of the disassembled continuous-flow injection reactor of FIG. 7.

FIG. 9 is a perspective view of disassembled nucleation zone unit 310 and residence time unit 320. FIG. 9 illustrates an embodiment of residence time unit 320 including an outer housing 311, a plurality of inner tubes 322 and ports 324, 326. Residence time unit 320 further includes a plurality of stabilizing members 327. Stabilizing members 327 provide support for inner tubes 322. Residence time unit 320 also includes a top plate 328 and a bottom plate 330. Top plate 328 covers the top of residence time unit 320 and includes a plurality of openings 329. Openings 329 are cooperatively dimensioned and positioned such that each opening 329 aligns with an inner tube 322. Nucleated nanoparticles exiting nucleation zone unit 310 flow through openings 329 and into inner tubes 322 within residence time unit 320. Bottom plate 330 covers the bottom of residence time unit 320 and includes a plurality of openings 331 cooperatively dimensioned and positioned such that each opening 331 aligns with an inner tube 322. Nanoparticles exit inner tubes 322 (and the residence time unit) through openings 331.

Advantages of injection reactor 305 include increased volume capacity and improved temperature control within residence time unit 320 as compared to an injection reactor having a single-tube residence time unit. The diameter of a residence time unit comprising a single tube is limited by the desired degree of temperature control within the residence time unit. Temperature can affect size and/or morphology of nanoparticles during their growth phase. As the diameter of the residence time unit increases, it becomes increasingly difficult to have a uniform temperature throughout the diameter of the residence time unit. For example, if the residence time unit is immersed in a heated water bath, a temperature gradient may form throughout the diameter of the residence time unit wherein fluid in the center is at a lower temperature than fluid flowing near the residence time unit walls. Accordingly, nanoparticles flowing through the centermost portion of the residence time unit are at a lower temperature than nanoparticles flowing near the outer walls of the residence time unit. This temperature variance can lead to undesirably increased diversity in nanoparticle size and morphology.

In contrast, the plural-tube residence time unit 320 shown in FIGS. 7-9 provides a plurality of narrow-diameter inner tubes through which the nanoparticles flow. The narrow diameter allows for rapid temperature equilibration within the inner tubes and leads to more uniform nanoparticle size and morphology.

III. Nanocrystal Synthesis and Morphology

The electrical and optical properties of nanocrystals (NCs) depend strongly on both size and shape. For instance, rod-shaped NCs exhibit a larger Stokes shift of the emission band than spherical-shape NCs, and provide a favored path for enhanced electronic transport. Solar cells require sufficient thickness for the absorption of all incident light; however, increased nanoparticle film thickness also increases the probability of carrier trapping at defects and recombination sites. Formation of the nanocrystals with anisotropic shapes requires a kinetic growth control other than thermodynamic control. In a kinetically-controlled growth regime, high-energy surfaces grow more quickly than low-energy surfaces. Shape control also can be achieved by using surface-selective surfactants to alter the relative growth rates of different crystal facets. For example, lauric acid can be used to control the shape of TiO2 nanoparticles (*JACS,* 125:15981-15985 (2003)), and hexylphosphonic acid can be used to control the shape of CdSe nanoparticles (*JACS,* 122:12700-12706 (2000)). In a working embodiment herein, TOP acts as a surface-selective surfactant for SnTe nanoparticles.

Size, size distribution, and production yield also can be affected by organic ligand/solvent selection and concentration. For example, tri-n-octylphosphine (TOP) is a fork shaped molecule with a phosphor in the center. In contrast, oleic acid (OA) is a linear chain molecule. The different bonding strengths and steric effects of these coordinating solvents affect size, size distribution and yield of nanocrystals. Thus, the relative ratios of these solvents during nanocrystal synthesis can be varied to achieve a desired nanocrystal size and/or size distribution, and/or to optimize production yield.

Embodiments of the disclosed injection reactors facilitate kinetically controlled growth by enabling precise control of temperature, concentration and reaction time. Embodiments of the disclosed injection reactors also transform small, lab-scale hot injection syntheses to large-scale, continuous syntheses.

A. Inorganic Nanocrystals

Nanoparticles are solid particulates found on a size scale of $10^{-9}$ meters. A variety of materials including ceramics, semiconductors and metals have been prepared in the form of nanoparticles. There has been significant progress in the synthesis of nanocrystals through solution chemistry. The underlying mechanism of a nanocluster and nanocrystal formation process begins with the collision of reactant molecules, followed by chemical reaction, nucleation, and growth. Sugimoto provided a list of factors for achieving monodispersed particle distribution. (Sugimoto, *Monodispersed Particles,* Elsevier, Amsterdam, 792 pp. (2001).) One factor is "separation between nucleation and growth." Crystallization from a supersaturated solution will compromise nucleation and growth simultaneously without careful control of the process. Thus, some of the particles will have been formed in the beginning of the process, whereas other new nucleuses form during the growth process of those earlier formed particles. This will lead to particles with appreciable breadth of size distribution. In order to prevent this, a good crystallization process should be limited to a nucleation burst and followed by a controlled growth process. Another factor is "inhibition of coagulation." Once particles are in direct contact, they often adhere to each other and are subject to coagulation. The typical measures to inhibit coagulation are use of a stabilizing medium, such as an electric double layer, a gel network, and dispersants. These requirements provide guidance to engineering a process for production of monodispersed nanocrystals. In summary, burst nucleation, controlled growth and inhibition of coagulation are three factors for achieving monodispersed nanocrystals.

Burst Nucleation:

Fast and uniform nucleation can be used to create a uniform supersaturation for burst nucleation. Nucleation zone units offer features that cannot be easily achieved by macroscopic devices, such as ultrafast nucleation on a microscale and integration in complex systems. The second feature, such as easy integration with a micro heat exchanger to achieve fast heat transfer, can be used for precisely controlling reaction temperature during the nucleation process (either exothermic or endothermic). In addition, the fast heating feature would provide opportunities for burst nucleation through temperature initiated reaction.

Controlled Growth:

A second factor for achieving monodispersed nanocrystal production is precise control of the crystal growth condition in the diffusion limited regime and without depleting the reactants thereby inducing a "defocusing" phenomenon through Ostwald ripening. This is achieved by precise control of reactant concentration, residence time and reaction temperature.

Inhibition of Coagulation:

In addition to using stabilizing agents (e.g., TOP and OA), the laminar flow in the nucleation zone reduces the possibility of particle collisions and alleviates the problem of nanoparticle growth through coagulation.

Embodiments of the disclosed injection reactors offer several advantages during nanoparticle synthesis. Continuous-flow injection reactors allow precise control over processing parameters including temperature, residence time, reactant concentration, nucleation efficiency, and/or flow characteristics.

Solely by way of example and without limitation, useful materials that may be formed using embodiments of the disclosed injection reactors include $Ag_2S$, $Ag_2Se$, $AgO$, $Ag_2O$, $Al_2O_3$, $As_2S_3$, $BaO$, $Bi_2S_3$, $Bi_2Se_3$, $CdO$, $CdS$, $CdSe$, $CdSnO$, $CdTe$, $CdZnS$, $CeO_2$, $CoS$, $CoSe$, $CoO$, $CrO_2$, $CuBiS_2$, $CuGaSe_2$, $Cu(In,Ga)Se_2$, $CuInSe_2$, $CuInS_2$, $Cu_{2-x}S$, $Cu_{2-x}Se$, $Cu_2O$, $FeO(OH)$, $Fe_2O_3$, $Fe_3O_4$, $GaAs$, $GaN$, $Ga_2O_3$, $GaP$, $Ge$, $GeO_2$, $HfO_2$, $HgS$, $HgSe$, $InGaAs$, $InAs$, $In_2O_3$, $InP$, $In_2S_3$, $In_2Se_3$, $La_2O_3$, $MgO$, $MnS$, $MnO_2$, $MoO_2$, $MoS_2$, $MoSe_2$, $NbO_2$, $NiS$, $NiSe$, $NiO$, $PbHgS$, $PbS$, $PbSe$, $PbTe$, $PbO_2$, $ReO_3$, $RhO_2$, $RuO_2$, $Sb_2S_3$, $Sb_2Se_3$, $SiGe$, $SiO_2$, $SnS$, $SnS_2$, $SnSe$, $SnTe$, $SnO_2$, $Sb_2S_3$, $TiO_2$, $TlS$, $TlSe$, $Tl_2O_3$, $VO_2$, $WO_2$, $Y_2O_3$, $ZnO$, $ZnS$, $ZnSe$, $ZrO_2$, etc., and combinations thereof.

By way of example, and without limitation, embodiments of the disclosed injection reactors can be used to make SnTe from a source of tin (II) and a source of tellurium. Examples, without limitation, of a suitable Sn (II) source are the halides, such as tin chloride ($SnCl_2$). The tin (II) source is then combined with a telluride source, such as tellurium powder dissolved in tri-n-octylphosphine, to form SnTe. The reactant solutions were pumped into a nucleation zone unit and then flowed through a residence time unit immersed in a temperature-controlled bath.

$CuInSe_2$ also has been processed using working embodiments of the present apparatus and system. $CuInSe_2$ nanoparticles were prepared from a first reactant solution comprising $CuCl_2$ and $InCl_3$ in oleic acid; and a second reactant solution comprising selenium powder dissolved in tri-n-octylphosphine. The reactant solutions were pumped into a nucleation zone unit and then flowed through a residence time unit immersed in a temperature-controlled bath.

As will be apparent to a person of ordinary skill in the art, the metal-based nanoparticles that are desirably formed using the present invention are produced by nucleation precursor materials that react within the injection reactor to form the desired nanoparticles. Any effective metal precursor material can be used with the present invention. Solely by way of example, and without limitation, particular examples of metal precursors include halides, acetates, nitrates, sulfates and carbonates. Mixtures of such precursors also can be used.

The reactant sources can be formulated with other materials that facilitate the process. For example, the metal source can be formulated with other materials, such as complexing agents. Many of the useful complexing agents are nitrogen-bearing compounds, including by way of example, and without limitation, ammonia, aliphatic amines, aliphatic amides, with particular examples including ammonia, triethanolamine, ethanolamine, diethylenetriamine, ethylenediaminetetracetate, hydrazine, nitrilotriacetate and triethylenetriamine. Plural different complexing agents also can be used in combination. The reactant sources also can be formulated in different solvents, such as water and/or organic solvent(s), to form a first fluid mixture and a second fluid mixture. The desired nanoparticles, such as tin telluride, are then formed by combining the first mixture with the second mixture.

The reactants also can include chalcogens, and hence chalcogenide precursors are compounds potentially useful for practicing the present invention. Examples of chalcogenide precursors include, by way of example and without limitation, thiourea, thioacetamide, thiocarbazide, thiosemicarbazide, ethylthiourea, allylthiourea, selenourea, N,N dimethyl selenourea, thiosulfate, selenosulfate, water, peroxide, persulfate, sodium hydroxide, urea, dimethylamineborane, trimethylamineborane, acetamide, hexamethyleneteramine, and combinations of such materials.

C. SnTe Nanocrystals

Embodiments of the disclosed injection reactors are suitable for continuous and rapid synthesis of shape- and size-controlled SnTe nanocrystals. In a working example, an injection reactor system 100 as shown in FIG. 1 was used. With respect to FIGS. 1, 2A and 3, a solution of $SnCl_2$ in TOP/OA was pumped into nucleation zone unit 110 via side inlet 113. A solution of TOPTe was injected through injection tube 112.

The shape and size of SnTe NCs can be tuned by controlling the reaction conditions. The use of both TOP and OA during synthesis affects the nucleation and growth process significantly. TOP binds more strongly to SnTe NCs than OA does. Thus, a high TOP concentration can suppress the nucleation process due to its bonding strength and steric hindrance effects. NC nuclei in a high chemical potential environment have a higher probability of forming anisotropic nanocrystals. Nucleation suppression leads to a lower number of nuclei formed during the nucleation step, and results in a higher concentration of monomers that are available in the growth step. This high concentration along with a higher temperature promotes the formation of rod-shaped NCs. A lower concentration of TOP favors formation of spherical NCs.

Embodiments of the disclosed injection reactors facilitate kinetically-controlled growth by precise control over temperature, concentration, and reaction time. For example, longer reaction times create a lower chemical potential environment, namely, equilibrium, and lead to formation of isotropic, or spherical, NCs. In a working embodiment using a injection reactor system as shown in FIG. 1, increasing the reaction time produced spherical NCs in addition to larger nanorods. Ostwald ripening is likely the cause for the broader and more skewed size and shape distribution.

Rod-shaped SnTe nanocrystals are favored by a) increased TOP concentration, b) increased temperature in the nucleation zone and/or residence time unit, and c) decreased reaction time. Conversely, spherical SnTe NCs are favored by a) reduced TOP concentration, b) reduced temperature in the nucleation zone and/or residence time unit, and c) increased reaction time. In a working embodiment, primarily spherical-shaped SnTe nanocrystals were produced when the temperature in the residence time unit was held between 170° C. and 180° C. When the temperature was held between 180° C. and 190° C., rod-shaped SnTe nanocrystals formed. Reaction time also affects the overall size of the NCs, with longer reaction times producing larger NCs. Reaction time can be adjusted by varying the flow rate and/or the length of the residence time unit.

D. $CuInSe_2$ Nanocrystals

Embodiments of the disclosed injection reactors are suitable for continuous and rapid synthesis of size-controlled $CuInSe_2$ nanocrystals. In a working example, an injection reactor system 100 as shown in FIG. 1 was used. With respect to FIGS. 1, 2A and 3, a solution of CuCl and $InCl_3$ in OA was preheated and pumped into nucleation zone unit 110 via side inlet 113. A solution of TOPSe was injected through injection tube 112.

The design of this injection reactor provides several advantages, including separation of the nucleation and growth processes, which facilitates narrow-size distribution of the resulting nanocrystals. Injecting TOPSe through injection tube 112 into a preheated solution of CuCl and $InCl_3$ in OA results in rapid nucleation in nucleation zone 116. The nucleation zone unit design also minimizes the degree to which nanocrystals may adhere on the outer housing wall 111 because nanocrystals are formed from the center of the nucleation zone unit 110. The nucleated particles then pass into the temperature-controlled residence time unit 120 where growth occurs. Sticking of nanocrystals on the residence time unit wall also is minimized because the nanocrystals initially are in the center of the tubing. Reaction times are controlled by the reactants' flow rate into the nucleation zone unit 110 and the length of residence time unit 120.

Figure 10:
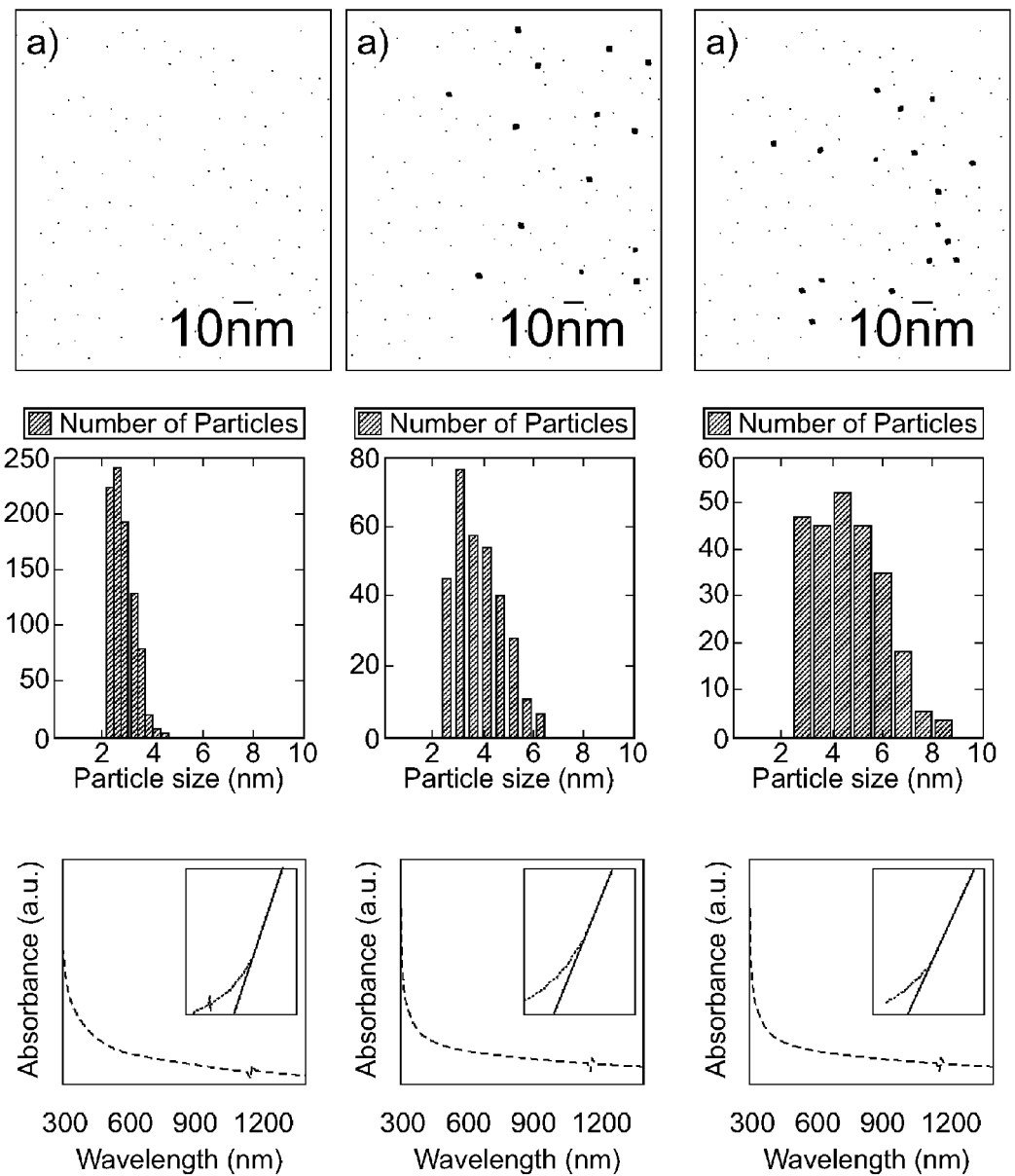
FIG. 10 is a series of TEM images (top), particle size distributions (middle) and UV-VS-IR spectra (bottom) of $CuInSe_2$ quantum dots with a median diameter of a) 2.6 nm, b) 3.5 nm, and c) 4.1 nm.

Nanocrystal size can be controlled by varying the reaction time and/or by tuning the ratio between the two coordinating solvents OA and TOP. The TEM images and the corresponding size distribution histograms of $CuInSe_2$ nanocrystals synthesized using different ratios between these two coordinating solvents are shown in FIG. 10. The TEM images and histograms clearly show that the sizes of the $CuInSe_2$ nanocrystals can be tailored with good size control. $CuInSe_2$ nanocrystals with a median size of 2.6 nm (FIG. 10a) were synthesized after injection of TOPSe into a CuCl and $InCl_3$ mixture in OA with a final OA:TOP ratio of 9:1. In contrast, $CuInSe_2$ nanocrystals with a median size of 3.7 nm were synthesized using a final OA:TOP ratio of 4:1. CuInSe$_2$ nanocrystals with a median size of 3.5 nm (FIG. 10b) were synthesized by reacting a CuCl/InCl$_3$ solution having an OA:TOP ratio of 4:1 with a Se solution having an OA/TOP ratio of 3:1. Even though the OA:TOP ratio was the same in the CuCl/InCl$_3$ solution, the resulting size, size distribution and most significantly the yield of CuInSe$_2$ nanocrystals are quite different owing to the difference in the Se coordination solvents (i.e., Se in an OA/TOP mixture instead of Se in pure TOP). CuInSe$_2$ nanocrystals with a median diameter of 4.1 nm (FIG. 10c) were synthesized by reacting a CuCl/InCl$_3$ solution having an OA:TOP ratio of 9:1 with a Se solution having an OA/TOP ratio of 3:1.

A possible mechanism for the size differences is the growth by Ostwald ripening. In other words, a relatively larger number of small nuclei were generated at the nucleation stage when the OA:TOP ratio was larger, i.e., the overall TOP concentration was lower. The formation of a large number of small nuclei depletes the residual monomer concentration in the nucleation zone. After the nuclei were formed, slow growth associated with low residual monomer concentration led to some nuclei having a size that falls within the critical nuclei size. The nuclei that are smaller than the size of critical nuclei will dissolve as Ostwald ripening occurs, resulting in a broad and skewed size distribution. In other words, larger nuclei will grow and smaller ones will dissolve and provide a monomer source from which the larger nuclei grow. Critical size can be calculated from free energy $$r_c = \frac{2V\gamma}{3k_B T \ln(S)}$$

where V is the molecular volume, r is the radius of the nuclei, $k_B$ is the Boltzmann constant, S is the saturation ratio, T is the temperature, and γ is the interfacial tension.

The different bonding strength and steric effect of various coordinating solvents affect nanocrystal size and yield. For example, size, size distribution and production yield of nanocrystals can be controlled by tuning the ratio of coordinating solvents. The solvent ratio affects the number of nuclei formed at the nucleation step and the remaining monomer concentration for the later growth step. The synthesis of CuInSe2 nanocrystals utilizes TOP and OA solvents. TOP is a fork-shaped molecule with a phosphor in the center. In contrast, OA is a linear chain molecule. TOP efficiently suppresses nuclei creation at the nucleation step due to its strong bonding and steric effect. When TOP is present in a relatively high concentration, metal halide precursors (e.g., CuCl, InCl$_3$) become much less reactive as compared to when TOP concentration is low. In a working embodiment, no nanocrystals were obtained after injection of TOPSe into a CuCl and InCl$_3$ mixture with an OA:TOP ratio of 7:3. However, when the OA:TOP ratio was 9:1, small quantum dots were obtained.

Figure 11:
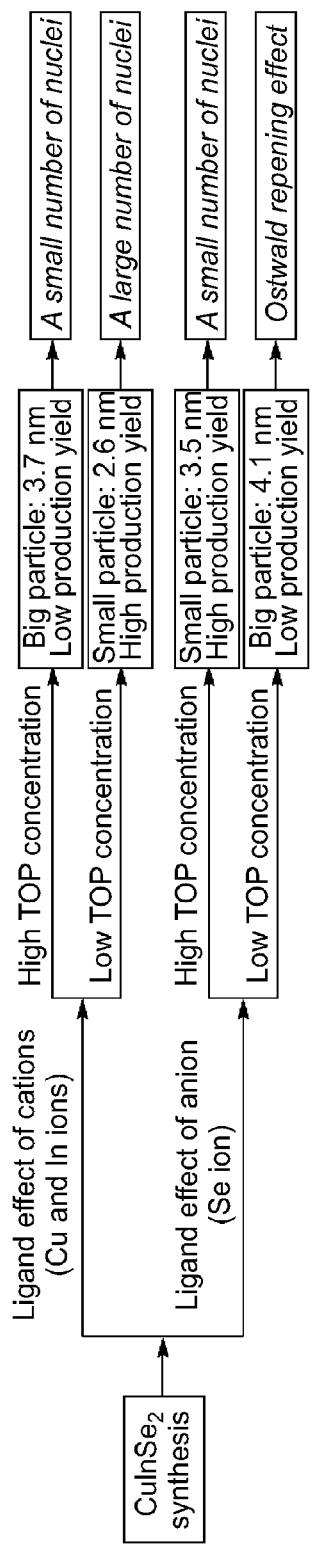
FIG. 11 is a flow diagram summarizing a size control strategy for synthesis of $CuInSe_2$ quantum dots.

FIG. 11 is a flow diagram summarizing a size control strategy for synthesis of CuInSe$_2$ quantum dots. As shown in FIG. 11, a high TOP concentration (e.g., OA/TOP ratio of 4:1) in the CuCl/InCl$_3$ solution produces large nanoparticles (e.g., 3.7 nm), but a low production yield due to a small number of nuclei forming when the Se solution mixes with the CuCl/InCl$_3$ solution. Conversely, a low TOP concentration (e.g., OA/TOP ratio of 9:1) in the CuCl/InCl$_3$ solution produces small nanoparticles (e.g., 2.6 nm) and a high production yield due to formation of a large number of nuclei during nucleation. The TOP concentration in the Se solution has an inverse effect. A high TOP concentration produces small particles (e.g., 3.5 nm) with a high production yield, and a small number of nuclei due to TOP suppression of nuclei generation. A low TOP concentration in the Se solution, however, produces a large number of nuclei, resulting in big particles (e.g., 4.1 nm) with a low production yield. The big particles result from Se monomer depletion and subsequent Ostwald ripening.

Figure 12:
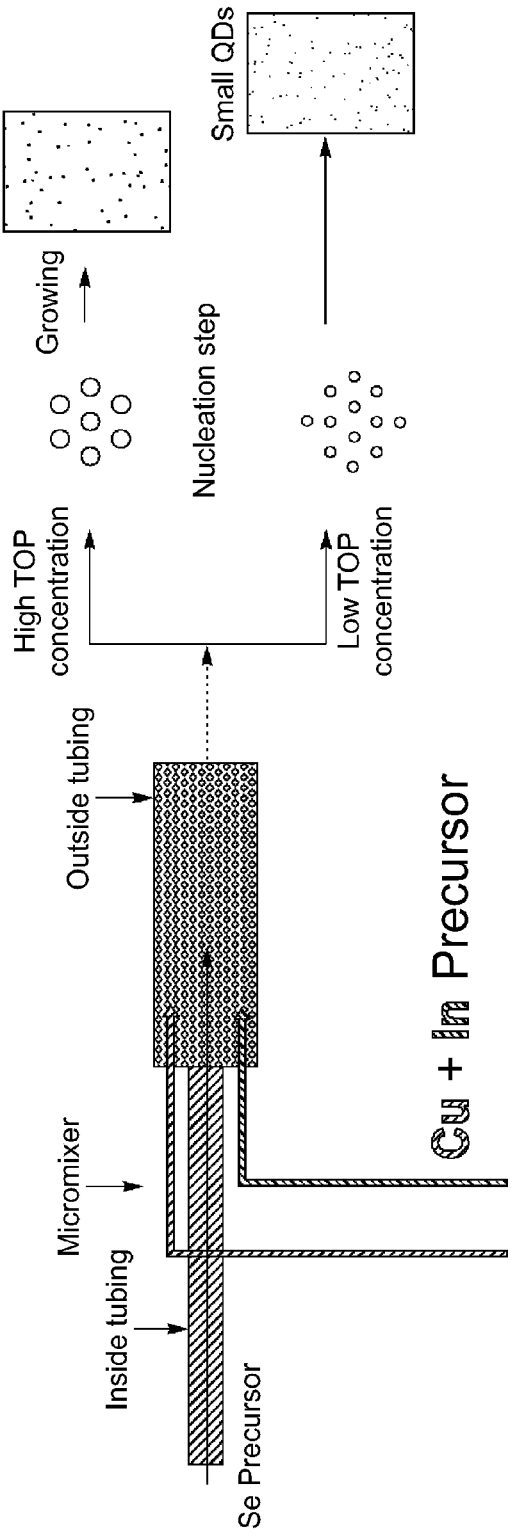
FIG. 12 is a flow diagram illustrating $CuInSe_2$ quantum dot synthesis with high and low tri-n-octylphosphine concentration using one embodiment of the disclosed reactors.

FIG. 12 is a flow diagram illustrating CuInSe$_2$ quantum dot synthesis using the injection reactor of FIG. 2A. A high TOP concentration in nucleation zone 116 produces fewer, larger nuclei, resulting in synthesis of larger quantum dots.

IV. Examples

Example 1

SnTe Synthesis and Characterization

Materials.

Tin (II) chloride (anhydrous, 99% min, Alfa), and tellurium powder (200 mesh, 99.8%, metal basis) were purchased and used without further purification. Trioctylphosphine (TOP) (technical grade, Aldrich), and oleic acid (OA) (technical grade, Aldrich) were purged with nitrogen gas for 30 minutes to remove oxygen.

SnTe Synthesis.

Precursor of Te:

A Te precursor, 1.4 mmol/ml, was made with Te powder and TOP and then this mixture was stirred at around 120° C. for several hours to give a clear solution of TOPTe.

Precursor of Sn:

Powdered SnCl$_2$ was added to TOP and OA (4:1 ratio) to make a 0.45 mmol/ml solution. This mixture was stirred at around 120° C. for several hours until the mixture clearly dissolved and the color turned to opaque white.

Synthesis of SnTe:

An injection reactor according to FIG. 1 was used for the synthesis. Sn precursor was preheated to about 100° C. and pumped (Series I pump, LabAlliance, State College, Pa.) into the nucleation zone unit with a flowrate of 0.25 ml/min, and the TOPTe precursor was pumped (REGLO peristaltic pump, ISMATEC SA, Switzerland) into the nucleation zone unit with a flowrate of 0.1 ml/min at the same time. The reaction time was controlled by a residence time unit (i.e., a length of polymer tubing (ID=1.6 mm, OD=3.2 mm)) in a hot silicon oil bath. To achieve a 5-minute reaction time, the tubing was 90 cm long. To achieve a 7-minute reaction time, the tubing was 126 cm long. In some syntheses, the residence time unit temperature was held between 170° C. and 180° C. to prepare spherical-shaped SnTe quantum dots; in others, the residence time unit temperature was held between 180° C. and 190° C. to prepare SnTe rods. A production rate of about 5 mg/min, or 300 mg/hr, was obtained with a injection reactor having a residence time unit with an internal volume of 1.78 cm$^3$.

Purification Process.

After the reaction, excess methanol was added to wash and precipitate the nanocrystals, followed by centrifugation at 5000 rpm for several hours. The supernatant was discarded, and then the nanocrystals were redispersed in either toluene or chloroform.

Characterization of Materials.

Figure 13:
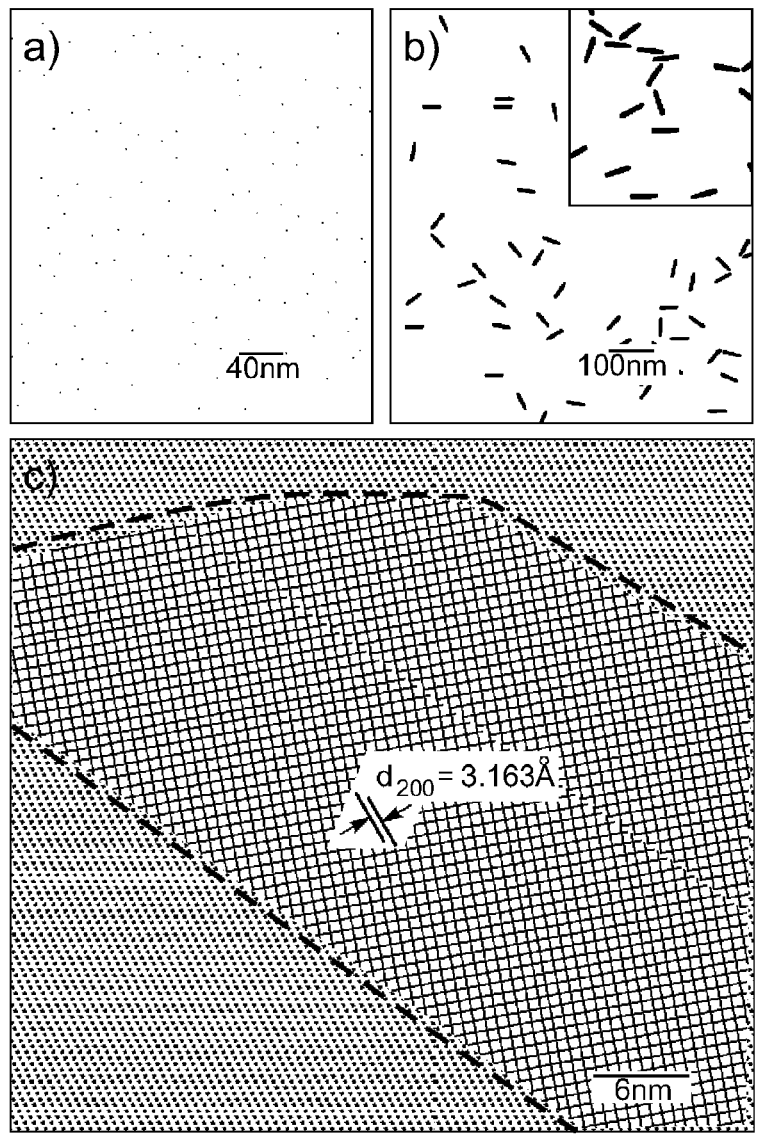
FIG. 13 is a series of transmission electron microscopy (TEM) images of SnTe quantum dots prepared with a 7-minute reaction time (a), and SnTe rods prepared with a 5-minute reaction time (b, c).
Figure 14:
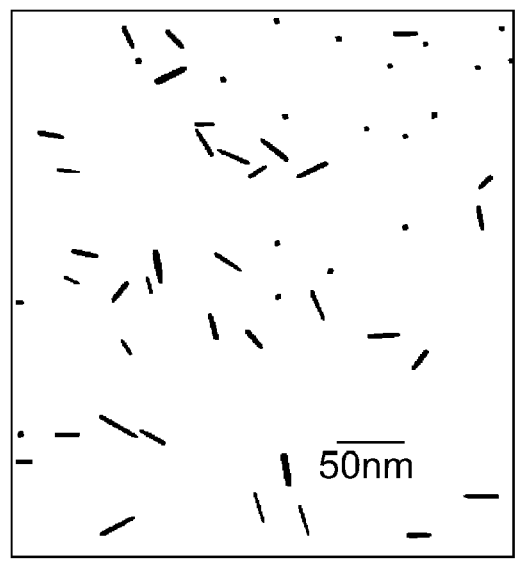
FIG. 14 is a TEM image of SnTe rods prepared with a 7-minute reaction time.
Figure 15:
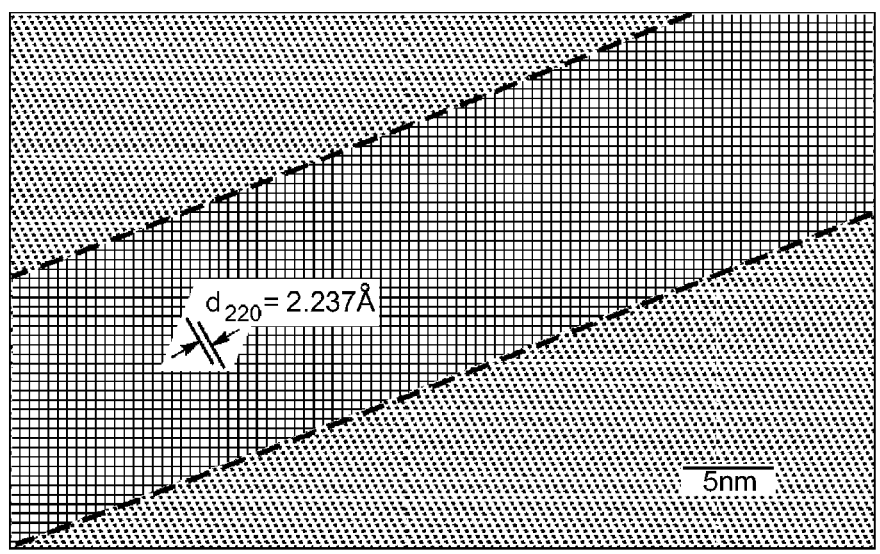
FIG. 15 is a high-resolution TEM image of an SnTe rod.
Figure 16:
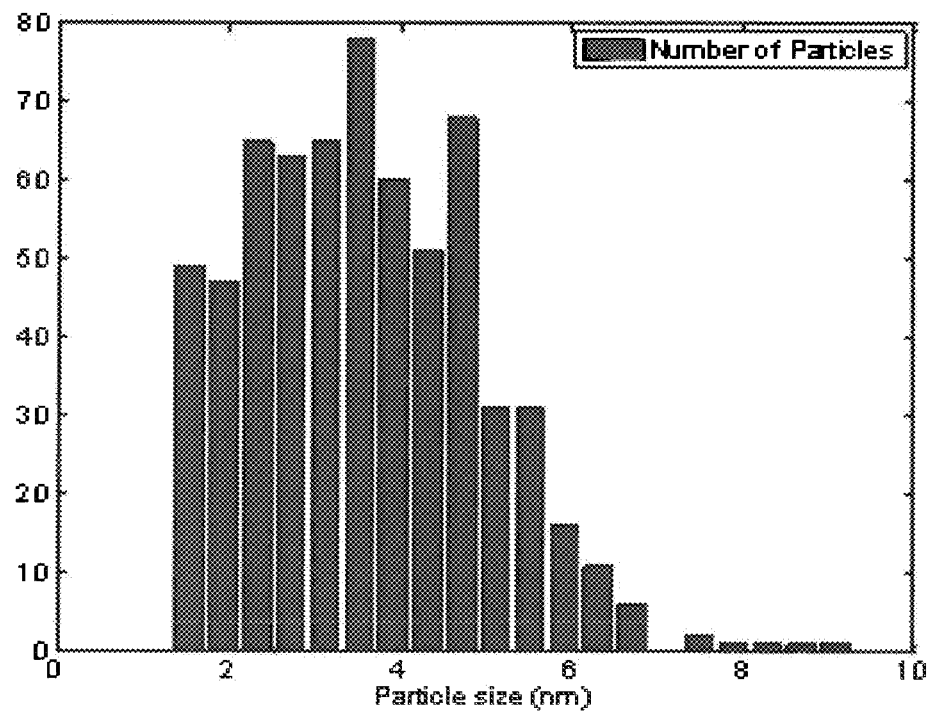
FIG. 16 is a bar graph illustrating the size distribution of SnTe quantum dots prepared with one embodiment of the disclosed reactor apparatus.

Transmission Electron Microscopy (TEM): A low resolution image was taken on a Philips CM-12 operating 80 KV, and a high resolution image was taken on a FEI Tecnai G$^2$ operating at 200 KV. NPs were drop-cast out of toluene solution onto carbon-coated 300-mesh copper grid. FIG. 13 is a series of TEM images of SnTe quantum dots prepared with a 7-minute reaction time at 170-180° C. (a), and SnTe rods prepared with a 5-minute reaction time at 180-190° C. (b, c). FIG. 14 is a TEM image of SnTe rods prepared with a 7-minute reaction time. FIG. 15 is a high-resolution TEM image of an SnTe rod. The SnTe rods were 15-25 nm wide and 50-70 nm long, with an aspect ratio of about 3. To calculate nanoparticle size, the ImageJ program was used. The size distribution of SnTe quantum dots is shown in FIG. 16. The quantum dots had a median diameter of 3.23 nm ($\sigma$=1.38, N=680).

Figure 17:
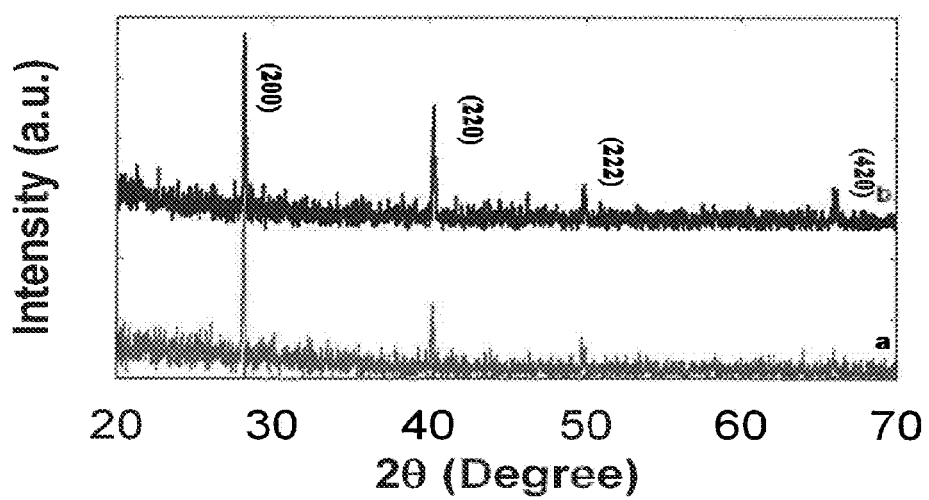
FIG. 17 is X-ray diffraction (XRD) spectra of SnTe quantum dots and rods prepared with a 7-minute reaction time.
Figure 18:
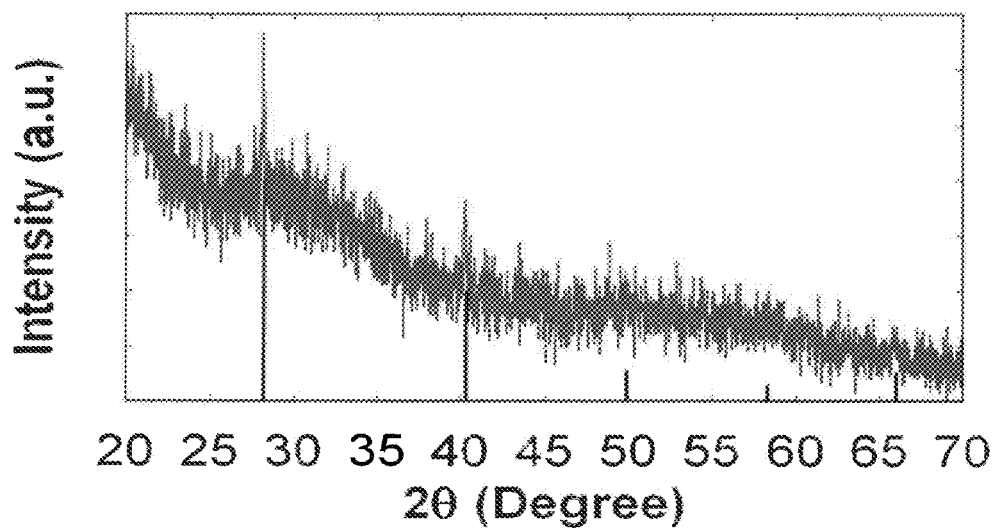
FIG. 18 is an XRD spectrum of SnTe rods prepared with a 5-minute reaction time.
Figure 19:
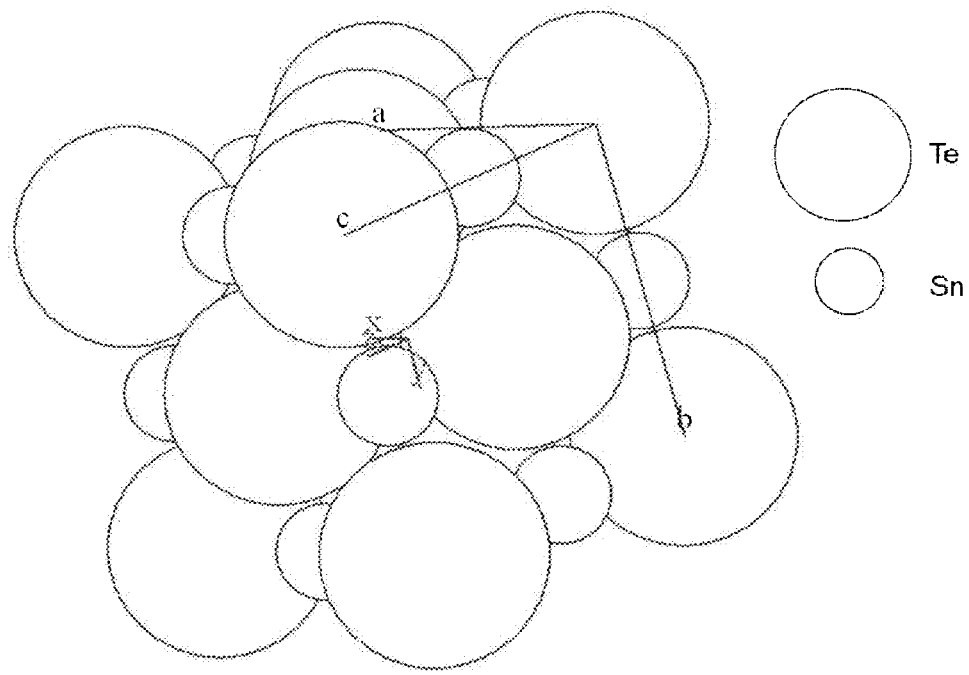
FIG. 19 is a simulated SnTe crystal structure.
Figure 20:
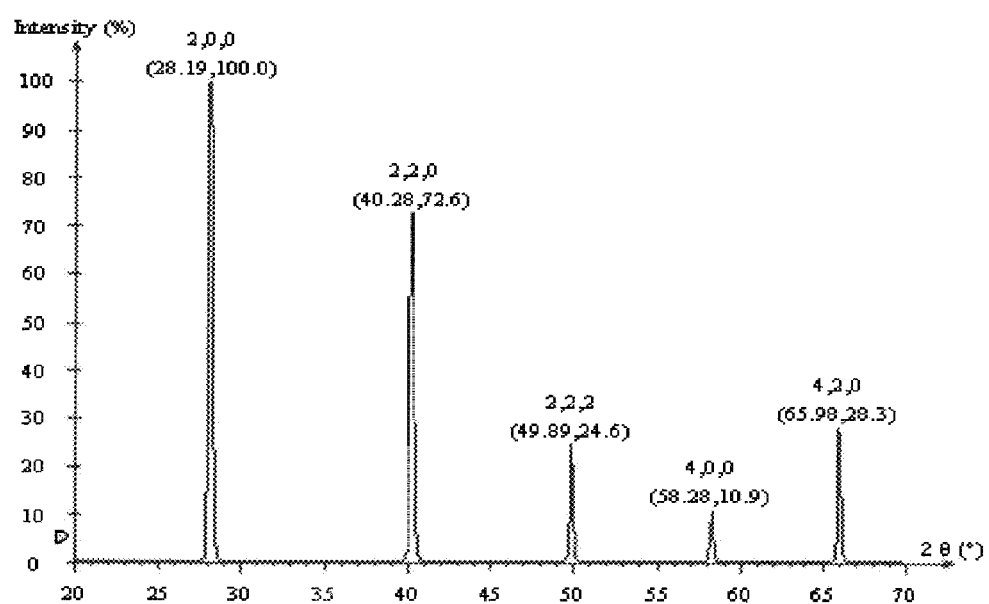
FIG. 20 is a simulated XRD pattern of SnTe.

X-ray diffraction (XRD): The phase and the crystallographic structure were characterized with K$\alpha$ radiation (Discover D8 operating at $\lambda$=1.54 nm). A glass slide was used as a substrate. FIG. 17 shows XRD spectra of SnTe quantum dots and rods prepared with a 7-minute reaction time. FIG. 18 shows an XRD spectrum of SnTe rods prepared with a 5-minute reaction time. The vertical lines (JCPDS 46-1210) in FIGS. 17-18 are the reference spectra of SnTe. The XRD spectra indicate that the SnTe nanocrystals have good crystallinity with a cubic rock-salt structure identical to that of bulk SnTe (space group Fm3m). FIG. 19 is a simulated SnTe crystal structure (Fm3m, a=6.327). The atomic coordinates are shown below in Table 1. FIG. 20 is a simulated XRD pattern of SnTe obtained by using the CaRIne Crystallography 3.1 program.

TABLE 1

| Atom | x | y | z |
|---|---|---|---|
| Sn | 1/2 | 1/2 | 1/2 |
| Te | 0 | 0 | 0 |

Figure 21A:
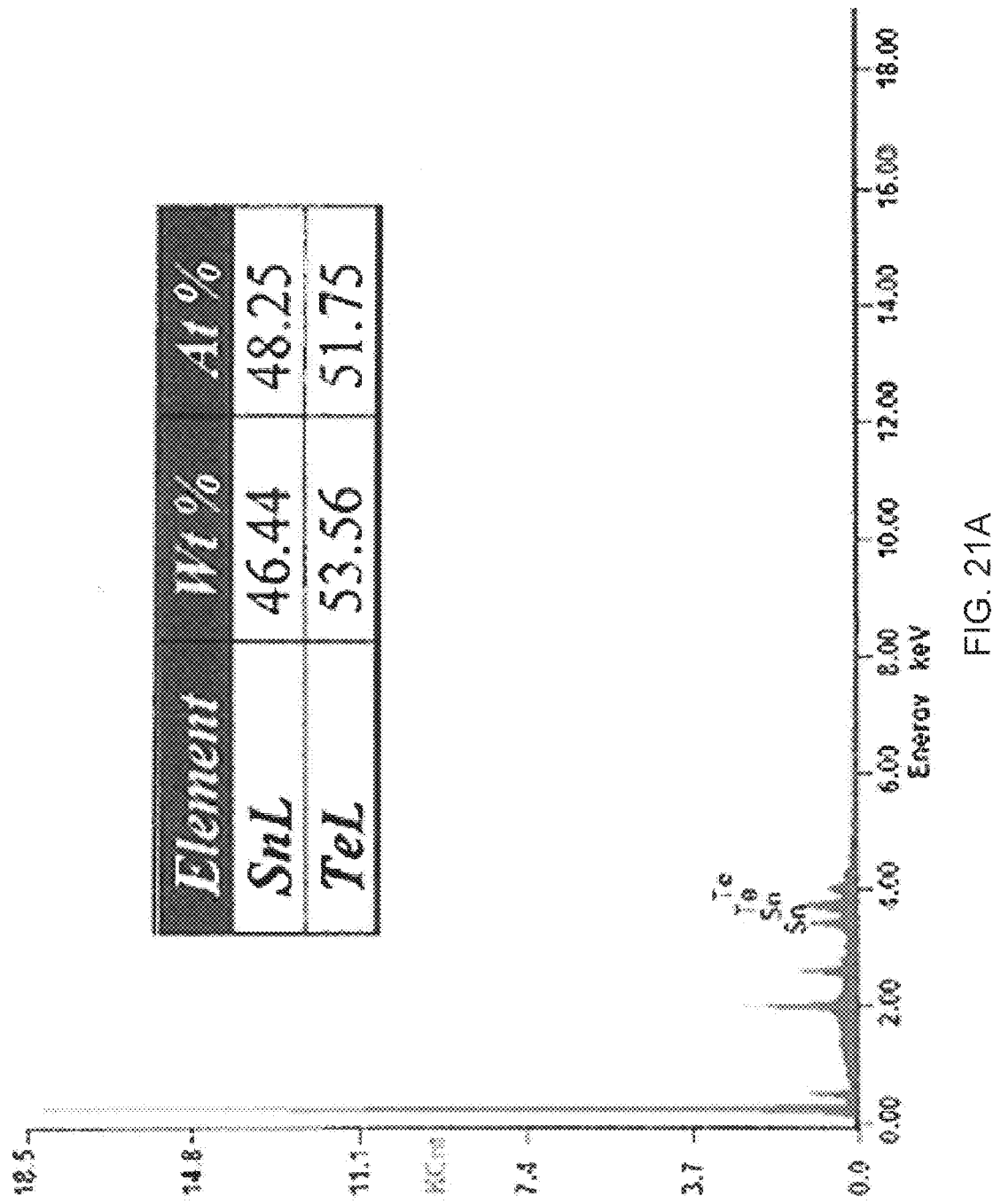
FIGS. 21A-B are energy dispersive spectroscopy (EDS) spectra illustrating the Sn:Te ratio of SnTe quantum dots and rods prepared with a 7-minute reaction time.
Figure 21B:
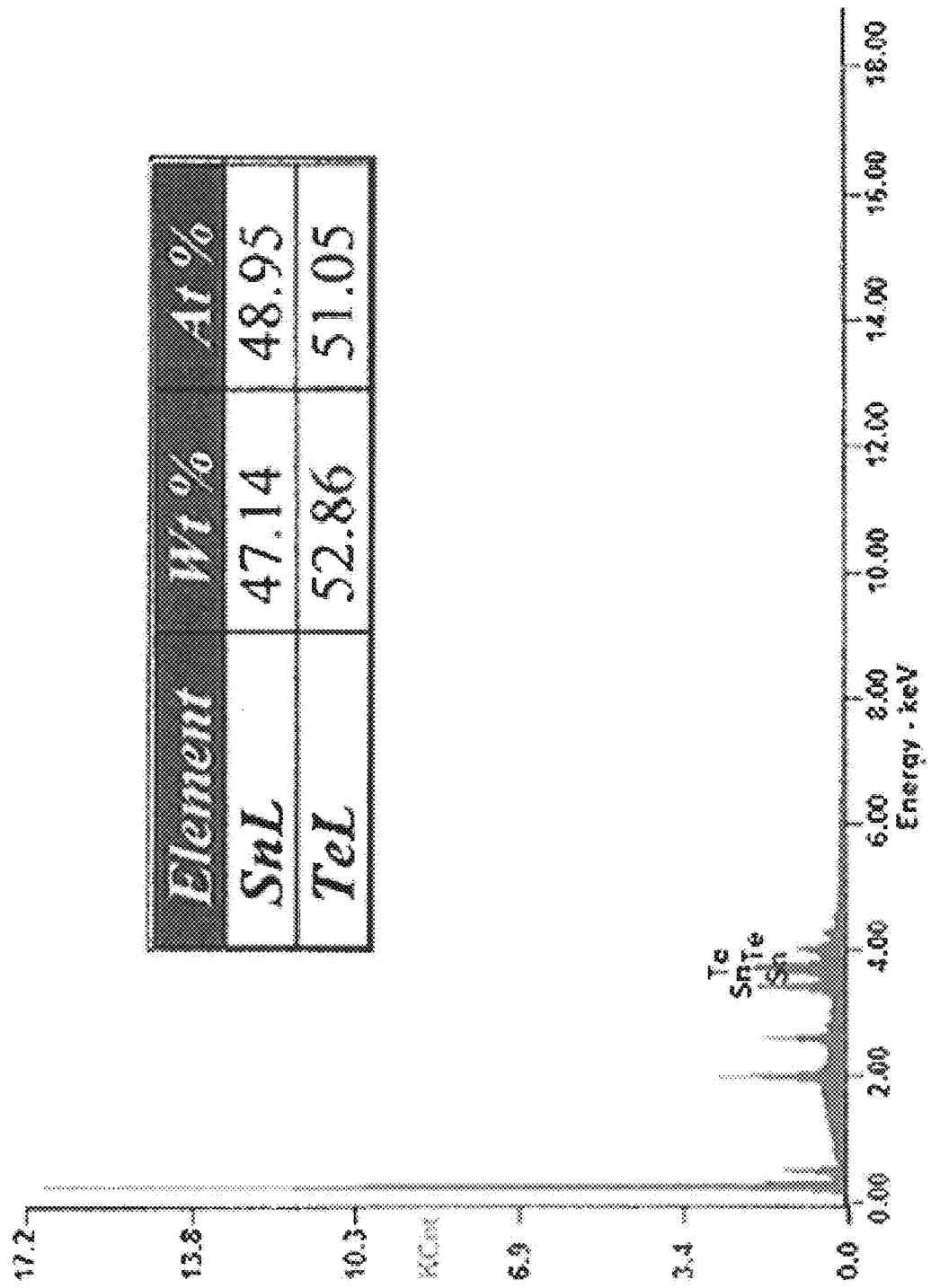

Energy Dispersive Spectroscopy (EDS): The composition was measured (EDS built in FEI Quanta 600F). FIGS. 21A-B illustrate the Sn:Te ratio of SnTe quantum dots (FIG. 21A) and SnTe rods (FIG. 21B) prepared with a 7-minute reaction time. EDS confirmed a nearly stoichiometric composition.

Figure 22:
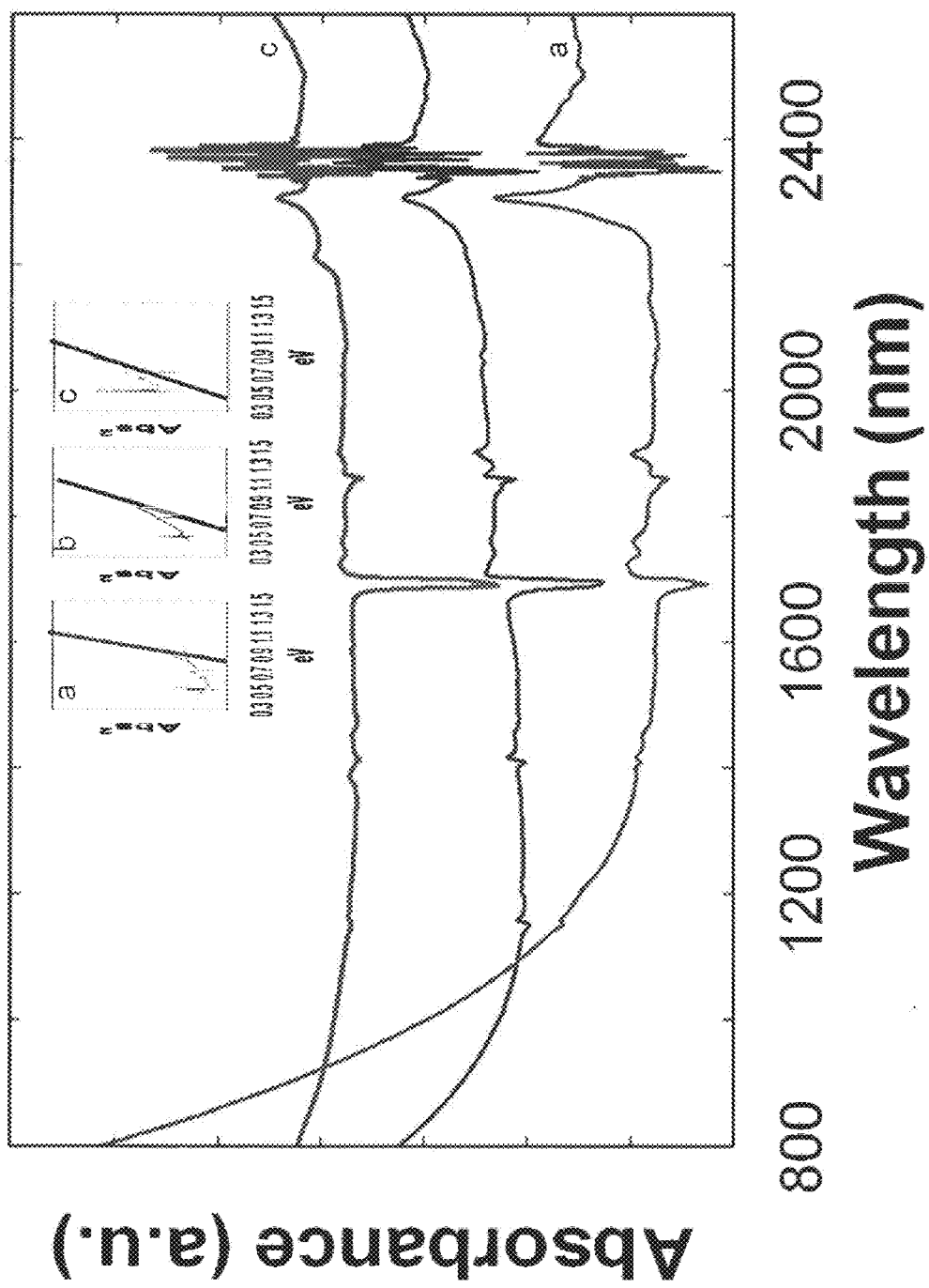
FIG. 22 is a series of IR absorption spectra of SnTe quantum dots (a), rods prepared with a 7-minute reaction time (b), and rods prepared with a 5-minute reaction time (c).

UV-visible and IR analysis: QDs were dispersed in chloroform and were analyzed using a JASCO V-670 spectophotometer. FIG. 22 is a series of IR absorption spectra of SnTe quantum dots (a), rods prepared with a 7-minute reaction time (b), and rods prepared with a 5-minute reaction time (c). Peaks at 1700 nm and 2400 nm were attributed to solvents, particularly chloroform.

Bandgaps were determined from the UV-VIS-IR spectra using the equation $$f\{x, y\} = \left\{eV = \frac{\lambda(\text{wavelength})}{1240}, (\text{Absorbance} \times eV)^2\right\}$$

A tangential line is drawn, and the bandgap is the value at which the line crosses the x-axis. (See inset plots on FIG. 22.) The bandgap of dot-shaped SnTe nanocrystals was estimated to be around 0.8 eV. The bandgaps of SnTe nanorods were determined to be 0.6 eV for a 5-minute reaction time and 0.4 eV for a 7-minute reaction time. The bandgap of 10-nm SnTe quantum dots has been reported previously to be around 0.5 eV (Kovalenko et al., *JACS*, 2007, 129:11354-11355.

Example 2

CuInSe$_2$ Synthesis and Characterization

Materials.

Copper (I) chloride (ACS 90+%, Alfa), indium (III) chloride anhydrous (99.99%, metal basis, Alfa), and selenium powder, −325 mesh (99.5%, metal basis, Alfa) were purchased and used without further purification. Trioctylphosphine (technical grade, Aldrich), and oleic acid (technical grade, Aldrich) were purged with nitrogen gas for 30 minutes to remove oxygen.

CuInSe$_2$ Synthesis (Continuous Process)

Precursor of Se:

A 1.4 mmol/ml solution was made with Se powder and TOP. The solution was stirred at about 90° C. for several hours to give a clear solution of TOPSe.

Precursor of Cu+In:

A mixture of 0.11 mmol/ml of CuCl and 0.34 mmol/ml of InCl$_3$ was made in TOP/OA with a ratio of 1:4 or 1:9. The mixture was stirred at about 90° C. for several hours until the solids clearly dissolved in TOP and OA and the color turned to light yellow.

Synthesis of CIS (CuInSe$_2$):

Cu+In precursor was heated to about 150° C. and pumped into a nucleation zone unit (as illustrated in FIG. 1) with a flowrate of 0.3 ml/min, and the TOPSe precursor simultaneously was pumped into the nucleation zone unit with a flowrate of 0.1 ml/min. The reaction time (8 minutes) was controlled by a length of polymer tubing (ID=1.6 mm, OD=3.2 mm, length=164 cm) in a hot silicon oil bath, and the temperature was held between 250° C. and 260° C.

Purification Process

After the reaction, excess MeOH was added to wash and precipitate the nanocrystals, followed by centrifugation at 5000 rpm for several hours. The supernatant was discarded and then the nanocrystals were redispersed in either toluene or chloroform.

Characterization of Materials.

Transmission Electron Microscopy (TEM): A low resolution image was taken on a Philips CM-12 operating 80 KV and a high resolution image was taken on a FEI Tecnai G$^2$ operating at 200 KV. NPs were dropeast out of toluene solution on carbon coated 300-mesh copper grid. To calculate NPs size, ImageJ program was used.

Figure 23:
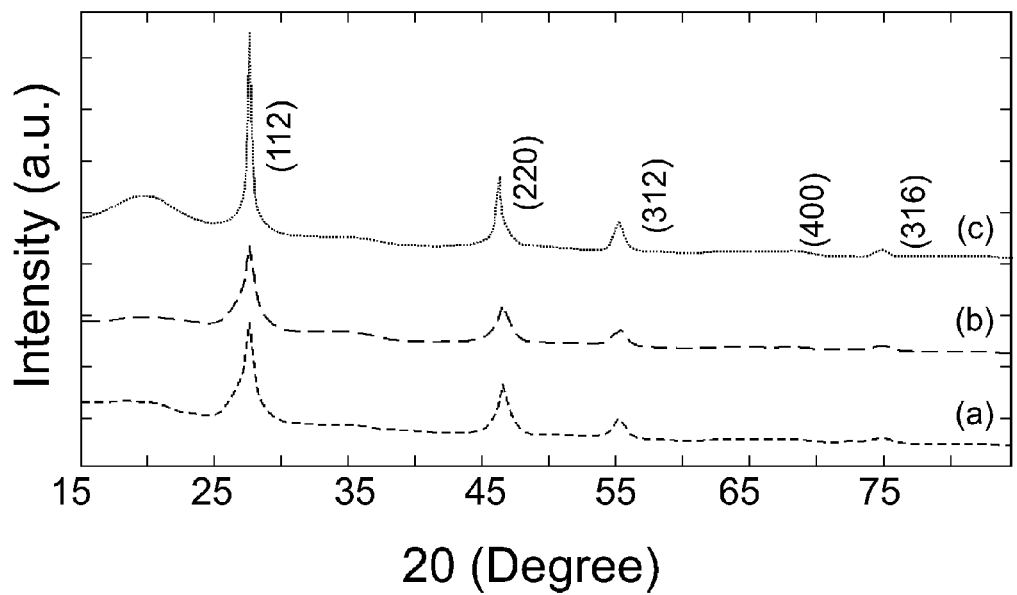
FIG. 23 is a series of XRD spectra of CIS quantum dots with a median diameter of 2.6 nm (a), 3.5 nm (b), and 4.1 nm (c).
Figure 24:
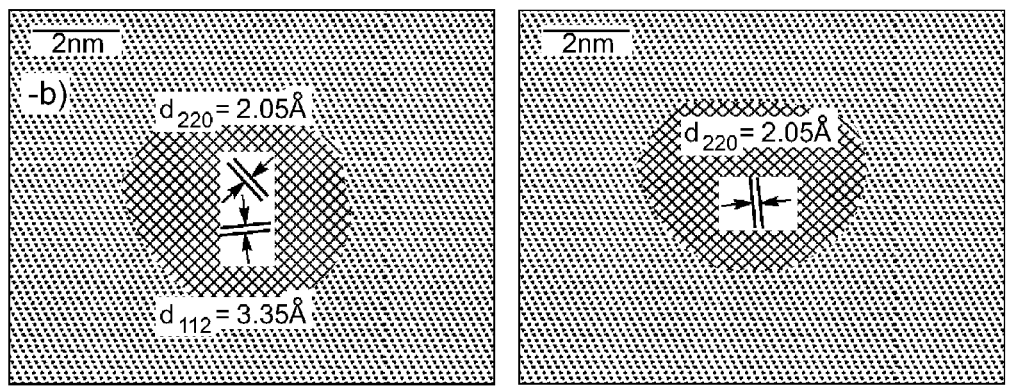
FIG. 24 is a pair of high-resolution TEM (HRTEM) images of CIS quantum dots with a median size of 3.5 nm.

X-ray diffraction (XRD): The phase and the crystallographic structure were characterized with K$\alpha$ radiation (Discover D8 operating at $\lambda$=1.54 nm). A glass slide was used as a substrate. The XRD spectra are shown in FIG. 23. The XRD results clearly indicate the formation of CuInSe$_2$. CuInSe$_2$ could exist in several forms including sphalerite (SP), chalcopyrite (CH) and CuAu ordering. The selenium anion sublattice remains the same with different cation orderings. The chalcopyrite structure has peaks at 17.2°, 27.7°, 30.9, 35.5° and 41.9° which correspond to the (101), (103), (200), (211), and (105) reflections respectively. The XRD confirmed the formation of CuInSe$_2$ nanocrystals. The broadening of XRD peaks for smaller nanocrystals can be seen clearly from the (112) peaks. The lattice fringes related to the (112) and (220) planes can be visualized clearly from the HRTEM images (FIG. 24).

Figure 25A:
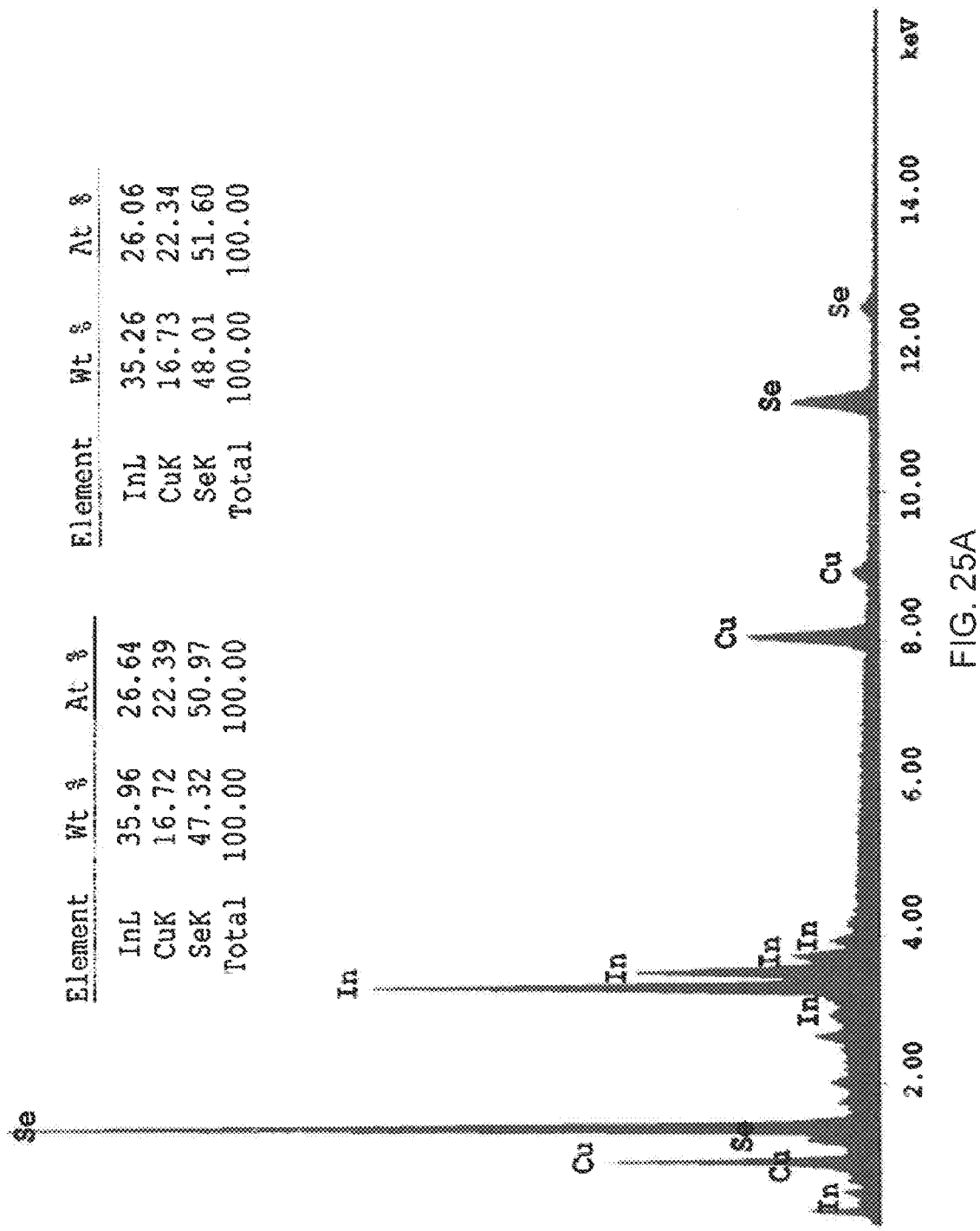
FIGS. 25A-C are EDS spectra illustrating the Cu:In:Se ratio of CIS quantum dots with a median diameter of 2.6 nm (25A), 3.5 nm (25B), and 4.1 nm (25C).
Figure 25B:
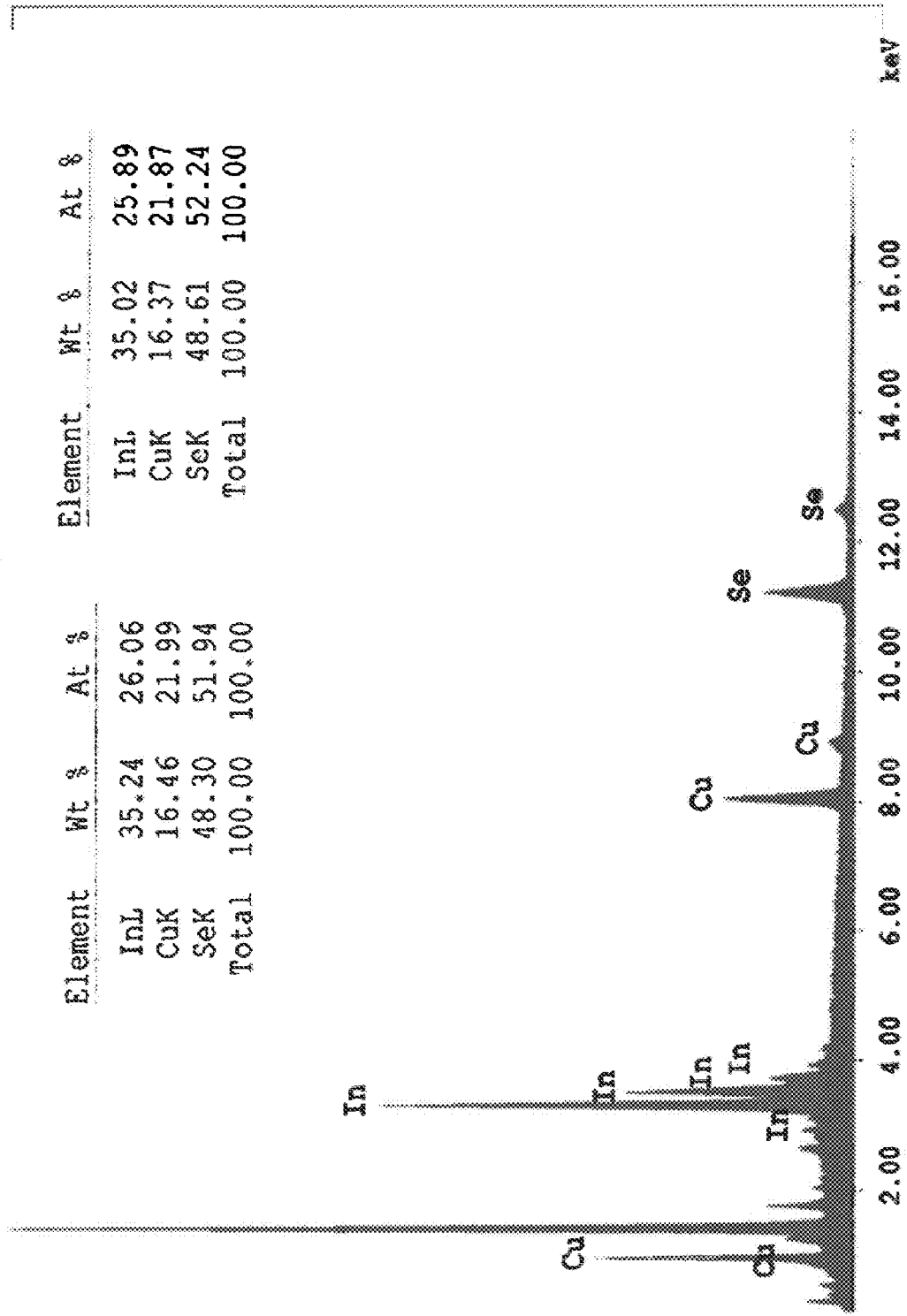
Figure 25C:
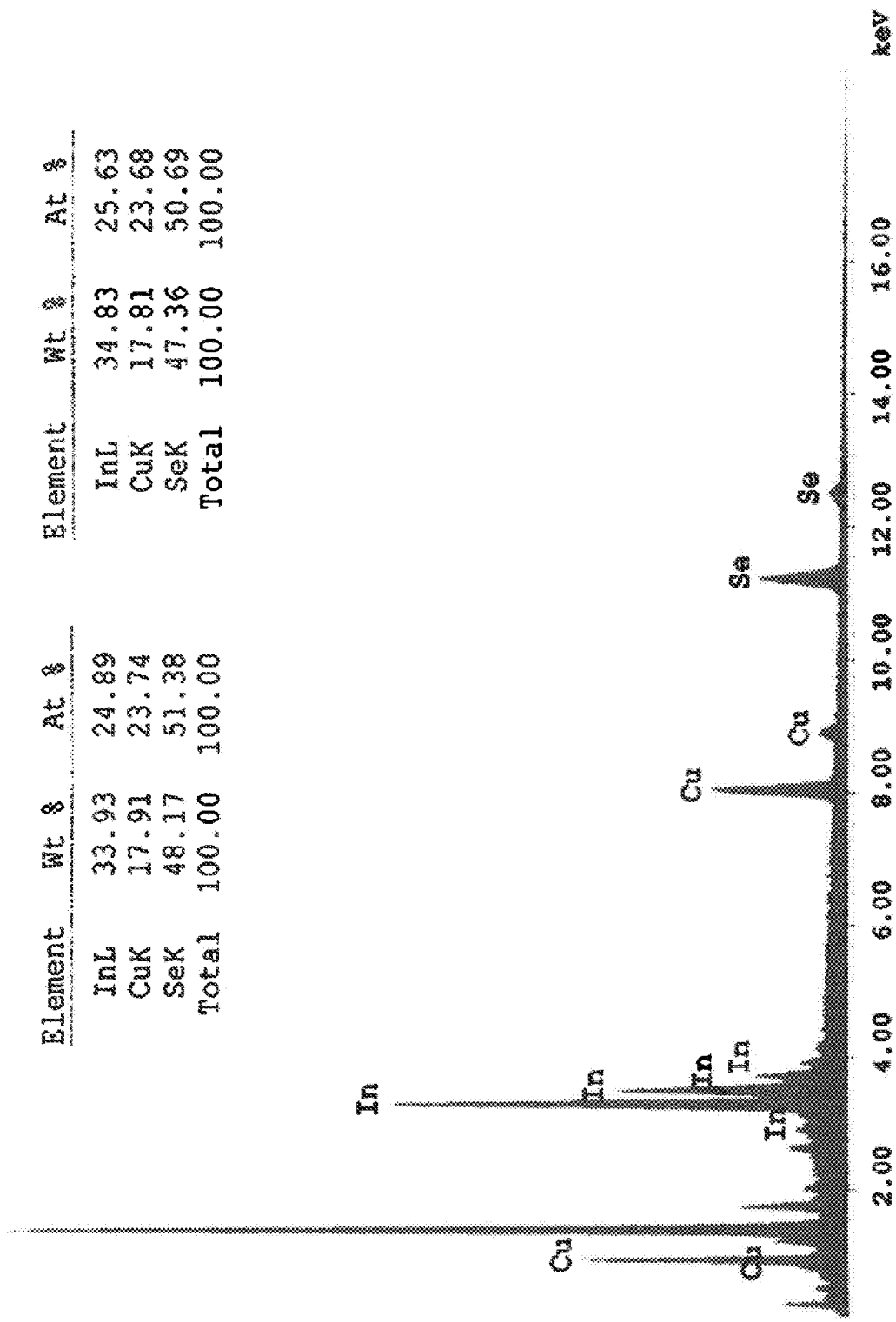

Energy Dispersive Spectroscopy (EDS): The composition was measured (EDS built in FEI Quanta 600F) after drying in a vacuum furnace at 200° C. for 1 hr to remove residual solvent. Two different spots were measured from the same sample. FIGS. 25A-C illustrate the Cu:In:Se ratio of CIS quantum dots with a median diameter of 2.6 nm (25A), 3.5 nm (25B), and 4.1 nm (25C), as determined by EDS data. The resulting average compositions show a stoichiometry close to 1:1.19:2.38, 1:1.19:2.37, and 1:1.05:2.16, respectively. The slightly indium-rich stoichiometry could be beneficial for photovoltaics as it is more likely to be a p-type semiconductor.

UV-visible and IR analysis: QDs were dispersed in chloroform and were analyzed using a JASCO V-670 spectophotometer. The spectra are shown in FIG. 10 (bottom panel).

The optical bandgaps were estimated to be 1.3 eV, 1.2 eV, and 1.1 eV for CuInSe$_2$ nanocrystals with a median size of 2.6 nm, 3.5 nm, and 4.1 nm, respectively. In comparison, the expected value for bulk CuInSe$_2$ is 1.04 eV. The blue shift is likely due to a quantum confinement effect.

Figure 26A:
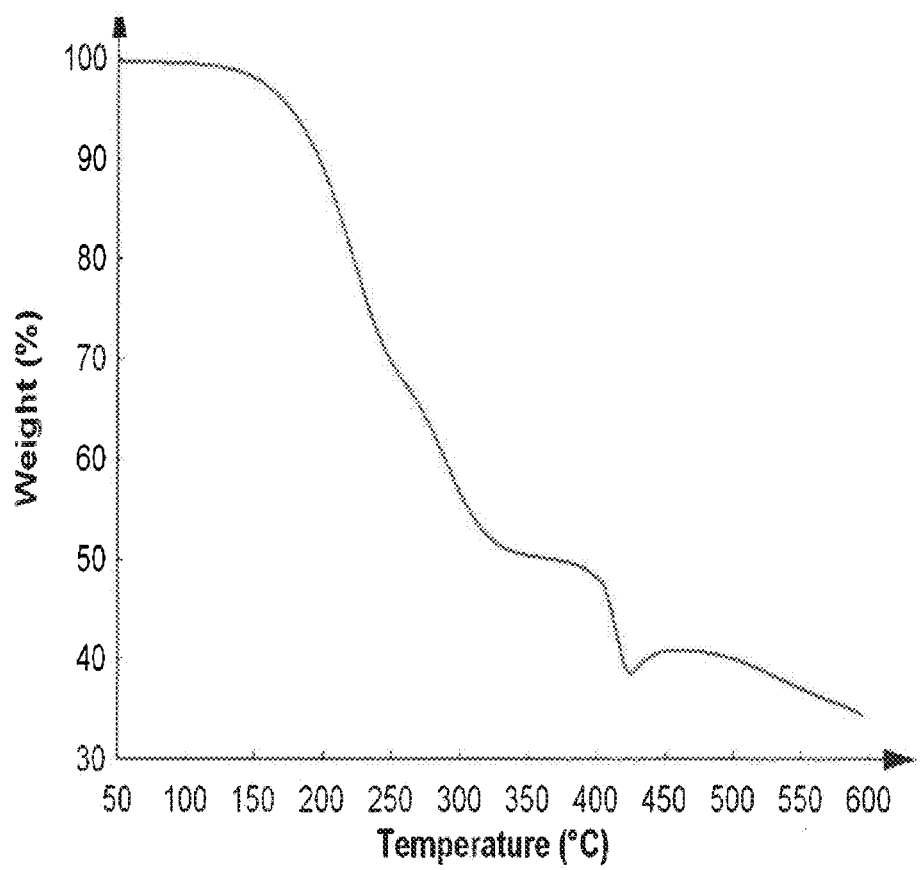
FIGS. 26A-C are graphs of weight versus temperature for CIS quantum dots with a median diameter of 2.6 nm (26A), 3.5 nm (26B), and 4.1 nm (26C).
Figure 26B:
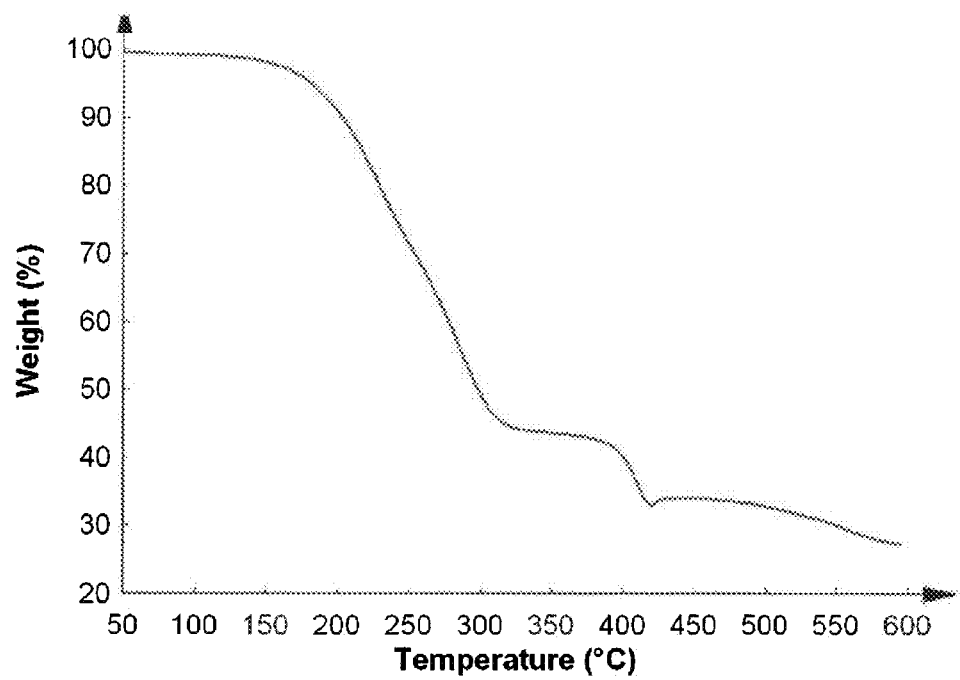
Figure 26C:
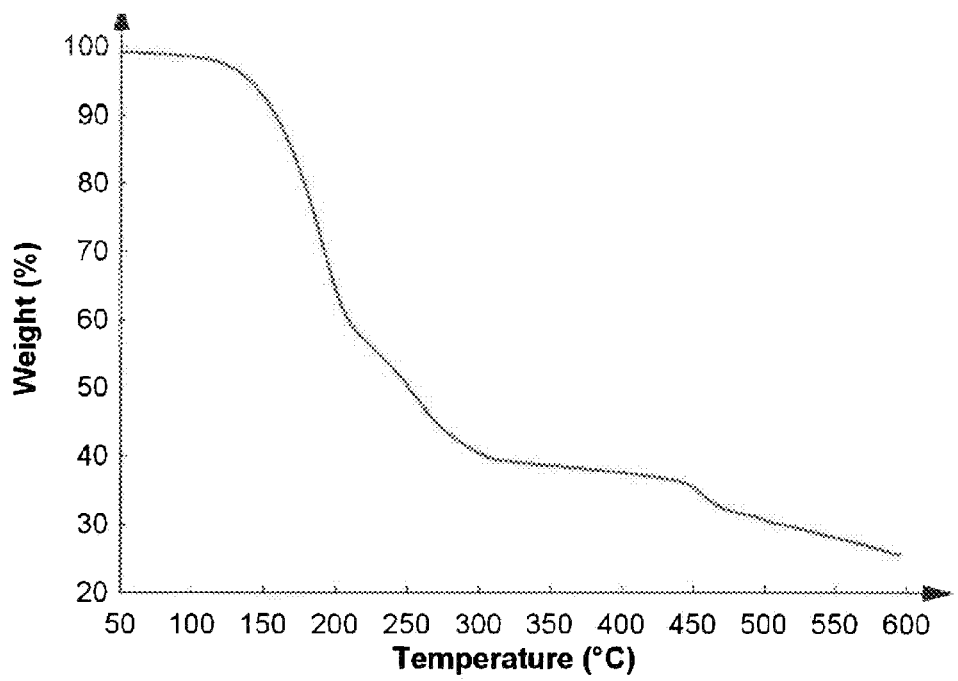

Thermal Gravimetric Analysis (TGA): QDs were placed in an aluminum pan with a heating rate of 10° C./min to 600° C. under with a dry nitrogen purge at 40 ml/min. FIGS. 26A-C are graphs of weight versus temperature for CIS quantum dots with a median diameter of 2.6 nm (26A), 3.5 nm (26B), and 4.1 nm (26C). The low-temperature weight loss curve (200° C.-300° C.) indicates the loss of TOP ligand. The high-temperature weight loss curve (400° C.-450° C.) indicated the loss of OA ligand. At approximately 450° C., the weight loss tapers off.

The overall results are summarized below in Table 2. It can be seen that different surfactant ratios result in different nanocrystal size, production yield and even weight of ligands grafted at the surface of CIS nanocrystals.

TABLE 2

| Concentration (mmol/ml) Cu:In:Se precursor | Surfactant Ratio (OA:TOP) | Median Size (nm)[a] | Production Yield (mg/min) | CIS (%)[b] | Composition (Cu:In:Se)[c] |
|---|---|---|---|---|---|
| 0.11:0.34:1.4 | 4:1 | 3.7 | 2.2 | 25 | 1:1.08:2.35 |
| 0.11:0.34:1.4 | 9:1 | 2.6 | 8.9 | 40 | 1:1.19:2.28 |
| 0.11:0.34:1.4 | 4:1[d] | 3.5 | 11 | 34 | 1:1.19:2.37 |
| 0.11:0.34:1.4 | 9:1[d] | 4.1 | 8.1 | 32 | 1:1.05:2.16 |
| 0.11:0.34:1.4 | 7:3 | Not synthesize | | | |
| 0.11:0.34:1.2 | 4:1 | Not synthesize | | | |

[a]calculated from Image J program.
[b]obtained from TGA (ligands are burned off during TGA).
[c]obtained from EDS.
[d]Se precursor dissolved in a mixture of TOP and OA as 3:1 volume ratio used.

In summary, CuInSe$_2$ nanocrystals were successfully synthesized with good size control using an embodiment of the disclosed continuous-flow injection reactor. Sizes ranging from 2.6 nm to 4.1 nm were achieved. High production rates up to 11 mg/min (or 660 mg/hr) were achieved using a hot injection reactor with a size of only 3.1867 cm$^3$. UV-Vis-NIR absorbance spectra showed that bandgaps of as-synthesized CuInSe$_2$ nanocrystals of different sizes could be adjusted between 1.1 eV and 1.3 eV by changing the OA to TOP ratios. The combination of this simple and facile synthesis with a scalable, continuous-flow hot injection reactor process could open up an opportunity for fabricating solar cells using CuInSe$_2$ nanocrystals synthesized via this size-tunable process for optimum solar energy harvesting.

Additional patent documents describing subject matter or background information which may be pertinent to the present disclosure include U.S. Pat. No. 7,507,380, issued Mar. 24, 2009, U.S. patent application Ser. No. 11/490,966, filed on Jul. 21, 2006, U.S. patent application Ser. No. 11/564, 759, filed on Nov. 29, 2006, U.S. patent application Ser. No. 11/595,479, filed Nov. 10, 2006, U.S. patent application Ser. No. 11/897,998, filed Aug. 31, 2007, International Application No. PCT/US2010/02201, filed Jan. 25, 2010, and U.S. patent application Ser. No. 12/798,755, filed Apr. 9, 2010, each of which is incorporated in its entirety herein by reference.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A continuous-flow injection reactor for synthesizing particles, comprising:
   a mixing zone unit comprising a) an outer housing comprising a top inlet, a bottom outlet, and a side inlet positioned between the top inlet and the bottom outlet, b) an injection tube inserted into the top inlet and positioned within the outer housing, the injection tube being of sufficient length to extend past the side inlet while terminating at about the lower edge of the side inlet and above the bottom outlet, and c) a mixing zone between a lower end of the injection tube and the bottom outlet of the mixing zone unit;
   a first fluid source providing a first reactant solution, operably coupled to the side inlet;
   a second fluid source providing a second reactant solution, operably coupled to the injection tube inserted into the top inlet; and
   a residence time unit, wherein the residence time unit has a diameter cooperatively dimensioned such that it can be removably coupled to the bottom outlet of the mixing zone unit.

2. The continuous-flow injection reactor of claim 1, where the side inlet and the injection tube are positioned perpendicular to one another.

3. The continuous-flow injection reactor of claim 1, further comprising a first heater disposed between the first fluid source and the side inlet such that the first reactant solution flows from the first fluid source through the first heater before flowing into the side inlet.

4. The continuous-flow injection reactor of claim 1, further comprising a second heater disposed between the second fluid source and the injection tube inserted into the top inlet such that the second reactant solution flows from the second fluid source through the second heater before flowing into the injection tube.

5. The continuous-flow injection reactor of claim 1, further comprising a removable fitting configured to removably couple the residence time unit to the mixing zone unit.

6. The continuous-flow injection reactor of claim 5 where the removable fitting further is configured such that a heat-transfer fluid can flow into the removable fitting through an inlet and flow out of the removable fitting through an outlet without directly contacting the mixing zone unit or the residence time unit.

7. The continuous-flow injection reactor of claim 1 where the residence time unit comprises a conduit of defined length.

8. The continuous-flow injection reactor of claim 7 where at least a portion of the conduit is in a temperature-controlled environment.

9. The continuous-flow injection reactor of claim 1, further comprising a heater coupled to the mixing zone unit and positioned to provide heat to the mixing zone.

10. The continuous-flow injection reactor of claim 1 where the mixing zone unit comprises a plurality of top inlets, and further comprises a plurality of injection tubes inserted through the plurality of top inlets, wherein each of the plurality of injection tubes is of sufficient length to extend past the side inlet while terminating above the bottom outlet.

11. The continuous-flow injection reactor of claim 10 where the injection tubes are positioned parallel to one another.

12. The continuous-flow injection reactor of claim 10 where the second fluid source is operably coupled to each of the plurality of injection tubes.

13. The continuous-flow injection reactor of claim 1 where the residence time unit comprises:
- an outer housing having a length "l," wherein the outer housing has a shape and diameter cooperatively dimensioned such that it can be removably coupled to the mixing zone unit; and
- a plurality of inner tubes positioned within the outer housing, the plurality of inner tubes positioned parallel to one another and extending at least length "l".

14. The continuous-flow injection reactor of claim 13 where the residence time unit outer housing further comprises an inlet and an outlet.

15. The continuous-flow injection reactor of claim 14 where a heat-transfer fluid source is operably coupled to the residence time unit outer housing inlet such that a heat-transfer fluid flows into the residence time unit through the outer housing inlet and flows out of the residence time unit through the outer housing outlet, wherein the heat-transfer fluid at least partially fills the outer housing and surrounds the plurality of inner tubes as it flows through the residence time unit.

16. The continuous-flow injection reactor of claim 15 where the heat-transfer fluid has a temperature T1 when it flows into the residence time unit and a temperature T2 when it flows out of the residence time unit, and the heat-transfer fluid that flows out through the residence time unit outer housing outlet is adjusted to temperature T1 and recycled to the outer housing inlet.

17. A continuous-flow injection reactor for synthesizing particles, comprising:
- a mixing zone unit comprising a) an outer housing comprising a plurality of top inlets, a bottom outlet, and a side inlet positioned between the plurality of top inlets and the bottom outlet, b) a plurality of injection tubes inserted through the plurality of top inlets, wherein each of the plurality of injection tubes is of sufficient length to extend past the side inlet while terminating at about the lower edge of the side inlet and above the bottom outlet, and c) a mixing zone between lower ends of the plurality of tubes and the bottom outlet of the mixing zone unit;
- a first fluid source providing a first reactant solution, operably coupled to the side inlet;
- a first heater disposed between the first fluid source and the side inlet such that the first reactant solution flows from the first fluid source through the first heater before flowing into the side inlet;
- a second fluid source providing a second reactant solution, operably coupled to each of the plurality of injection tubes;
- a second heater disposed between the second fluid source and the plurality of injection tubes such that the second reactant solution flows from the second fluid source through the second heater before flowing into the plurality of injection tubes;
- a residence time unit comprising a) an outer housing having a length "l," wherein the outer housing has a shape and diameter cooperatively dimensioned such that it can be removably coupled to the mixing zone unit, and b) a plurality of inner tubes positioned within the outer housing, the plurality of inner tubes extending at least length "l"; and
- a removable fitting configured to removably couple the residence time unit to the mixing zone unit.

18. The continuous-flow injection reactor of claim 17 where the injection tubes are positioned parallel to one another.

19. The continuous-flow injection reactor of claim 18 where the injection tubes are positioned perpendicular to the side inlet.

20. The continuous-flow injection reactor of claim 17 where the inner tubes are positioned parallel to one another.

21. The continuous-flow injection reactor of claim 17 where the removable fitting further is configured such that a heat-transfer fluid can flow into the removable fitting through an inlet and flow out of the removable fitting through an outlet without directly contacting the mixing zone unit or the residence time unit.

22. The continuous-flow injection reactor of claim 17, further comprising a heater coupled to the mixing zone unit and positioned to provide heat to the mixing zone.

23. The continuous-flow injection reactor of claim 17 where the residence time unit outer housing further comprises an inlet and an outlet.

24. The continuous-flow injection reactor of claim 23 where a heat-transfer fluid source is operably coupled to the residence time unit outer housing inlet such that a heat-transfer fluid flows into the residence time unit through the outer housing inlet and flows out of the residence time unit through the outer housing outlet, wherein the heat-transfer fluid substantially fills the outer housing and surrounds the plurality of inner tubes as it flows through the residence time unit.

25. The continuous-flow hot injection reactor of claim 24 where the heat-transfer fluid has a temperature T1 when it flows into the residence time unit and a temperature T2 when it flows out of the residence time unit, and the heat-transfer fluid that flows out through the residence time unit outer housing outlet is adjusted to temperature T1 and recycled to the outer housing inlet.

26. A method for synthesizing particles, comprising:
- providing a first reactant solution;
- providing a second reactant solution;
- flowing the first reactant solution into a continuous-flow injection reactor comprising a mixing zone unit and a residence time unit, wherein the mixing zone unit comprises a) an outer housing comprising a top inlet, a bottom outlet, and a side inlet positioned between the top inlet and the bottom outlet, b) an injection tube inserted into the top inlet and positioned within the outer housing, the injection tube being of sufficient length to extend past the side inlet while terminating at about the lower edge of the side inlet and above the bottom outlet, and c) a mixing zone between a lower end of the injection tube and the bottom outlet of the mixing zone unit, and wherein the first reactant solution flows into the mixing zone unit through the side inlet at a flow rate sufficient to at least partially fill the outer housing between the side inlet and the bottom outlet;
- flowing the second reactant solution into the mixing zone unit through the injection tube inserted into the top inlet of the mixing zone unit at a flow rate suitable to combine a fluid stream of the second reactant solution with the first reactant solution in the mixing zone to produce a plurality of nucleated particles;
- flowing the plurality of nucleated nanoparticles into and through the residence time unit, wherein the residence time unit is maintained at a desired temperature; and
- collecting particles as they flow out of the residence time unit.

27. The method of claim 26, further comprising heating the first reactant solution to a first temperature before flowing the first reactant solution into the mixing zone unit through the side inlet.

28. The method of claim 26, further comprising heating the second reactant solution to a second temperature before flowing the second reactant solution into the mixing zone unit through the injection tube.

29. The method of claim 26 where the particles are nanoparticles.

30. A method for synthesizing particles, comprising:
providing a first reactant solution;
providing a second reactant solution;
flowing the first reactant solution into a continuous-flow injection reactor comprising a mixing zone unit and a residence time unit, wherein the mixing zone unit comprises a) an outer housing comprising a plurality of top inlets, a bottom outlet, and a side inlet positioned between the plurality of top inlets and the bottom outlet, b) a plurality of injection tubes inserted through the plurality of top inlets, wherein each of the plurality of injection tubes is of sufficient length to extend past the side inlet while terminating at about the lower edge of the side inlet and above the bottom outlet, and c) a mixing zone between lower ends of the plurality of tubes and the bottom outlet of the mixing zone unit, and wherein the first reactant solution flows into the mixing zone unit through the side inlet at a flow rate sufficient to at least partially fill the outer housing between the side inlet and the bottom outlet;
flowing the second reactant solution into the mixing zone unit through the plurality of injection tubes inserted into the plurality of top inlets of the mixing zone unit at a flow rate suitable to combine a plurality of fluid streams of the second reactant solution with the first reactant solution in the mixing zone to produce a plurality of nucleated particles;
flowing the plurality of nucleated particles into and through the residence time unit, wherein the residence time unit comprises a) an outer housing having a length "l," wherein the outer housing has an inlet, an outlet, and a shape and diameter cooperatively dimensioned such that it can be removably coupled to the mixing zone unit, and b) a plurality of inner tubes positioned within the outer housing, the plurality of inner tubes extending at least length "l," and wherein the residence time unit is operably coupled to the mixing zone unit such that the plurality of nucleated particles flows through the plurality of inner tubes;
concurrently flowing a heat-transfer fluid at a desired temperature through the residence time unit inlet and into the residence time unit outer housing; and
collecting particles as they flow out of the residence time unit.

31. The method of claim 30, further comprising heating the first reactant solution to a first temperature before flowing the first reactant solution into the mixing zone unit through the side inlet.

32. The method of claim 30, further comprising heating the second reactant solution to a second temperature before flowing the second reactant solution into the mixing zone unit through the plurality of injection tubes.

33. The method of claim 30 where the particles are nanoparticles.

* * * * *